(12) United States Patent
Kwon et al.

(10) Patent No.: US 10,915,323 B2
(45) Date of Patent: Feb. 9, 2021

(54) METHOD AND DEVICE FOR PROCESSING AN INSTRUCTION HAVING MULTI-INSTRUCTION DATA INCLUDING CONFIGURABLY CONCATENATING PORTIONS OF AN IMMEDIATE OPERAND FROM TWO OF THE INSTRUCTIONS

(71) Applicant: Samsung Electronics Co., Ltd., Suwon-si (KR)

(72) Inventors: Ki-seok Kwon, Suwon-si (KR); Min-wook Ahn, Seoul (KR); Suk-jin Kim, Seoul (KR); Young-hwan Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 15/520,168

(22) PCT Filed: Oct. 14, 2015

(86) PCT No.: PCT/KR2015/010810
§ 371 (c)(1),
(2) Date: Apr. 19, 2017

(87) PCT Pub. No.: WO2016/064131
PCT Pub. Date: Apr. 28, 2016

(65) Prior Publication Data
US 2017/0315811 A1    Nov. 2, 2017

(30) Foreign Application Priority Data

Oct. 20, 2014   (KR) .................. 10-2014-0141694

(51) Int. Cl.
*G06F 9/30*    (2018.01)
*G06F 9/38*    (2018.01)
*G06F 9/34*    (2018.01)

(52) U.S. Cl.
CPC ........ *G06F 9/30087* (2013.01); *G06F 9/3012* (2013.01); *G06F 9/3013* (2013.01);
(Continued)

(58) Field of Classification Search
CPC .... G06F 9/30087; G06F 9/30167; G06F 9/34; G06F 9/3012; G06F 9/06; G06F 9/30; G06F 9/30101
(Continued)

(56) References Cited

U.S. PATENT DOCUMENTS 6,167,505 A * 12/2000 Kubota ............... G06F 9/30149
                                                                    712/210
6,282,633 B1   8/2001 Killian et al.
(Continued)

FOREIGN PATENT DOCUMENTS

JP    2002-539520 A    11/2002
JP    2013-093051 A    5/2013
(Continued)

OTHER PUBLICATIONS

Machine translation obtained on Nov. 1, 2018 of Korean Patent Publication 10-2008-0101104 by Park et al., pp. 1-12.*

(Continued)

*Primary Examiner* — Aimee Li
*Assistant Examiner* — Shawn Doman
(74) *Attorney, Agent, or Firm* — Jefferson IP Law, LLP

(57) ABSTRACT

Provided is a data processing method including the operations of storing, in a register, a first immediate portion included in a first instruction, from among the first immediate portion and a second immediate portion that constitute an immediate value, which is an operand; determining the immediate value by catenating the second immediate portion included in a second instruction with the stored first immediate portion; and performing an operation by using a value
(Continued)

indicated by the second instruction and the determined immediate value.

12 Claims, 11 Drawing Sheets

(52) U.S. Cl.
CPC ............ *G06F 9/30167* (2013.01); *G06F 9/34* (2013.01); *G06F 9/3824* (2013.01)

(58) Field of Classification Search
USPC ........................................................ 712/226
See application file for complete search history.

(56) References Cited

U.S. PATENT DOCUMENTS

| | | | |
|---|---|---|---|
| 6,314,504 B1 | 11/2001 | Dent | |
| 6,687,806 B1* | 2/2004 | McGrath | G06F 9/30167 712/200 |
| 6,732,257 B1* | 5/2004 | Sheaffer | G06F 9/3016 712/209 |
| 7,143,266 B1 | 11/2006 | Bhardwaj et al. | |
| 7,574,583 B2 | 8/2009 | Leijten et al. | |
| 7,941,651 B1* | 5/2011 | Toll | G06F 9/30003 712/225 |
| 9,116,685 B2 | 8/2015 | Plondke et al. | |
| 9,612,838 B2 | 4/2017 | Arakawa | |
| 2003/0097543 A1* | 5/2003 | Wishneusky | G06F 9/3851 712/34 |
| 2004/0083349 A1* | 4/2004 | Luick | G06F 9/30167 711/216 |
| 2012/0284489 A1* | 11/2012 | Plondke | G06F 9/30167 712/226 |
| 2013/0086362 A1 | 4/2013 | Gschwind et al. | |
| 2015/0019845 A1* | 1/2015 | Anderson | G06F 9/30167 712/220 |

FOREIGN PATENT DOCUMENTS

| | | |
|---|---|---|
| KR | 10-2001-0050804 A | 6/2001 |
| KR | 10-2001-0092736 A | 10/2001 |
| KR | 20070047373 * | 5/2007 |
| KR | 10-2008-0101104 A | 11/2008 |
| KR | 10-2014-0036321 A | 3/2014 |

OTHER PUBLICATIONS

Korean Office Action dated Sep. 25, 2020, issued in Korean Application No. 10-2014-141694.

* cited by examiner

METHOD AND DEVICE FOR PROCESSING AN INSTRUCTION HAVING MULTI-INSTRUCTION DATA INCLUDING CONFIGURABLY CONCATENATING PORTIONS OF AN IMMEDIATE OPERAND FROM TWO OF THE INSTRUCTIONS

TECHNICAL FIELD

The present invention relates to data processing methods and devices, and more particularly, to a method and device for performing an operation with respect to a plurality of operands.

BACKGROUND ART

The core technology of modern computers is a processor. A processor is a functional unit for decoding and executing an instruction in a computer, and may refer to a central processing unit (CPU).

The processor includes an instruction set, a register memory space, and the like. Instruction sets are roughly classified into reduced instruction set computers (RISCs) and complex instruction set computers (CISCs).

Numerous types of operations may be performed by a processor. The processor may perform many operations.

However, the same method is not always used to perform the same type of operations. Even the same type of operations may require different time periods according to operation-performing methods.

In particular, when a processor performs many operations, an increase in the speed of each operation greatly affects an overall operation-processing speed.

DETAILED DESCRIPTION OF THE INVENTION

Technical Problem

The present invention provides a method and device for enhancing a data processing speed.

Technical Solution

Provided is a data processing method including the operations of storing, in a register, a first immediate portion included in a first instruction, from among the first immediate portion and a second immediate portion that constitute an immediate value, which is an operand; determining the immediate value by catenating the second immediate portion included in a second instruction with the stored first immediate portion; and performing an operation by using a value indicated by the second instruction and the determined immediate value.

Advantageous Effects

According to some embodiments of the present invention, a data processing speed may be increased.

According to some embodiments of the present invention, when an operation is performed on a plurality of operands, the speed at which the operation is performed may be increased.

BEST MODE

Figure 1:
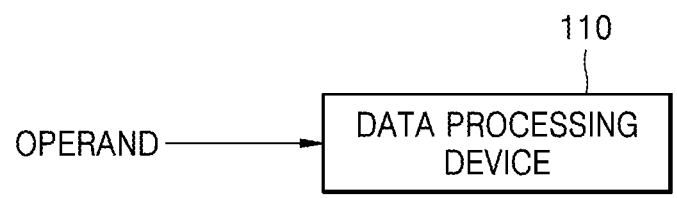
FIG. 1 is a schematic diagram of a data processing device according to some embodiments.

According to an aspect of the present invention, a data processing method includes the operations of storing, in a register, a first immediate portion included in a first instruction, from among the first immediate portion and a second immediate portion that constitute an immediate value, which is an operand; determining the immediate value by catenating the second immediate portion included in a second instruction with the stored first immediate portion; and performing an operation by using a value indicated by the second instruction and the determined immediate value.

The register that stores the first immediate portion may include an immediate register.

The performing of the operation may include performing an operation by using a value stored in a register corresponding to an address included in the second instruction and the determined immediate value.

The performing of the operation may include performing an operation by using values stored in registers corresponding to a plurality of addresses included in the second instruction and the determined immediate value.

The storing of the first immediate portion in the register may include determining an immediate value allocated space, which is a data storage space allocated in the first instruction to store the immediate value; and determining the first immediate portion and the second immediate portion, based on the determined immediate value allocated space.

The determining of the first immediate portion and the second immediate portion, based on the determined immediate value allocated space may include determining the first immediate portion such that a data storage space required to store the first immediate portion is equal to the immediate value allocated space.

The storing of the first immediate portion in the register may include determining an immediate value allocated space, which is a data storage space allocated in the first instruction to store the immediate value; and determining the first immediate portion and the second immediate portion that constitute the immediate value, when a data storage space required to store the immediate value is larger than the immediate value allocated space.

The first instruction may include at least one of an MTII instruction, an MTI instruction, and an WI instruction, and the second instruction may include at least one of an ADDI2 instruction and an MADI2 instruction.

The storing of the first immediate portion in the register may include determining a number of bits required to store the first immediate portion and a number of bits required to store the second immediate portion.

The performing of the operation may include receiving the value indicated by the second instruction from an operation unit; and performing an operation by using the received value and the determined immediate value.

The performing of the operation may include receiving the value indicated by the second instruction from an immediate register; and performing an operation by using the received value and the determined immediate value.

The value indicated by the second instruction may be an immediate value included in the second instruction.

According to another aspect of the present invention, a data processing device includes a storage unit configured to store a first immediate portion included in a first instruction from among the first immediate portion and a second immediate portion that constitute an immediate value, which is an operand; a catenator configured to catenate the second immediate portion included in a second instruction with the stored first immediate portion to determine the immediate value; and an operation unit configured to perform an operation by using a value indicated by the second instruction and the determined immediate value.

The storage unit may include at least one of a register and an immediate register.

The operation unit may perform an operation by using a value stored in a register corresponding to an address included in the second instruction and the determined immediate value.

The operation unit may perform an operation by using values stored in registers corresponding to a plurality of addresses included in the second instruction and the determined immediate value.

The storage unit may determine an immediate value allocated space, which is a data storage space allocated within the first instruction to store the immediate value, and determine the first immediate portion and the second immediate portion based on the determined immediate value allocated space.

The storage unit may determine the first immediate portion such that a data storage space required to store the first immediate portion is equal to the immediate value allocated space.

The storage unit may determine the immediate value allocated space, which is the data storage space allocated within the first instruction to store the immediate value, and may determine the first immediate portion and the second immediate portion when a data storage space required to store the immediate value is larger than the determined immediate value allocated space.

The first instruction may include at least one of an MTII instruction, an MTI instruction, and an WI instruction, and the second instruction may include at least one of an ADDI2 instruction and a MADI2 instruction.

The storage unit may determine the number of bits required to store the first immediate portion and the number of bits required to store the second immediate portion.

The operation unit may receive a value indicated by the second instruction from the operation unit and may perform an operation by using the received value and the determined immediate value.

The operation unit may receive the value indicated by the second instruction from an immediate register and may perform an operation by using the received value and the determined immediate value.

The value indicated by the second instruction may be an immediate value included in the second instruction.

According to another aspect of the present invention, a non-transitory computer-readable recording medium may have recorded thereon a computer program, which, when executed by a computer, performs the data processing method.

MODE OF THE INVENTION

Embodiments now will be described more fully hereinafter with reference to the accompanying drawings. The various embodiments below are only to specify the present invention and are not to restrict or limit the right scope of the present invention. It is interpreted that matters which could be readily inferred by one of ordinary skill in the art to which the present invention pertains from the detailed description and the various embodiments belong to the scope of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including," "having," and "comprising" are intended to indicate the existence of the components or steps thereof disclosed in the specification, and are not intended to preclude the possibility that one or more other components or steps thereof may exist or may be added.

FIG. 1 is a schematic diagram of a data processing device 110 according to some embodiments.

The data processing device 110 may include all objects capable of processing data. For example, the data processing device 110 may be a compiler recorded in a storage medium to perform all functions which will be described later. As another example, the data processing device 110 may include a module that performs a function of determining a first immediate portion and a second immediate portion that constitute an immediate value, which is an operand. As another example, the data processing device 110 may include a central processing unit (CPU) that performs a function of storing, in a register, the first immediate portion included in a first instruction from among the first immediate portion and the second immediate portion that constitute the immediate value, which is an operand. As another example, the data processing device 110 may include a program stored in a storage medium capable of performing a function of determining the immediate value by catenating the second immediate portion included in a second instruction with the first immediate portion stored in the register. As another example, the data processing device 110 may include an operation device that performs an operation by using a value indicated by the second instruction and the determined immediate value.

Registers, which are data storage spaces, may be classified into immediate registers and general registers. In detail, the immediate registers may denote registers specialized to store an immediate value. The general registers may denote registers other than the immediate registers from among the registers. However, this classification is conceptual, and is not interpreted as limiting the present invention.

The data processing device 110 may perform an operation. Accordingly, the data processing device 110 may receive at least one operand and perform an operation with respect to the operand. For example, the data processing device 110 may receive 2 and 5 as operands and perform an add operation with respect to 2 and 5. At this time, the data processing device 110 may output 7 as a result of the add operation.

The data processing device 110 may receive an operand from a predetermined data storage device. For example, the data processing device 110 may receive data or an operand from at least one of a register, a register file, an immediate register, an internal memory, an external memory, random access memory (RAM), dynamic RAM (DRAM), and cache memory.

According to an embodiment, the data processing device 110 may receive an operand from a register file. The operand may be included in an instruction.

The data processing device 110 may process several types of instructions. Instructions that may be processed by the data processing device 110 may be all instructions related with execution of an operation. Several examples of the instructions are as follows.

The data processing device 110 may process an instruction of writing an immediate value included in an instruction to an immediate register file. For example, this instruction may be an MTII instruction.

The data processing device 110 may process an instruction of writing a value of another register file to the immediate register file. For example, this instruction may be an MTI instruction.

The data processing device 110 may process an instruction of writing a value of the immediate register file to another register file. For example, this instruction may be an MFI instruction.

The data processing device 110 may also process at least one instruction of using, as an input, a value obtained by catenating an immediate value included in an instruction with a value of the immediate register file. For example, the at least one instruction may be an ADDI2 instruction and an MADI2 instruction.

The data processing device 110 may process data by using an instruction that does not require memory load. The data processing device 110 may perform an operation with respect to a predetermined capacity or more of immediate value by using two instructions. Power required to execute the instruction that does not require memory load may be less than power required to execute an instruction that requires memory load. For example, when 100 cycles are required to execute memory load, the data processing device 110 may reduce the time required to process data to 2 cycles or less and also may reduce the power consumed.

Because the data processing device 110 uses the instruction that does not require memory load, the data processing device 110 is highly likely to utilize instruction level parallelism (ILP) in a superscalar or very long instruction word (VLIW) processor.

The data processing device 110 may be based on an instruction set architecture and is applicable to all types of processors capable of processing data. For example, the data processing device 110 may be used in a scalar/vector processor, a superscalar/VLIW/coarse-grained reconfigurable array (CGRA) processor, and a CPU/digital signal processor (DSP)/graphic processing unit (GPU)/application specific instruction processor (ASIP).

Figure 2:
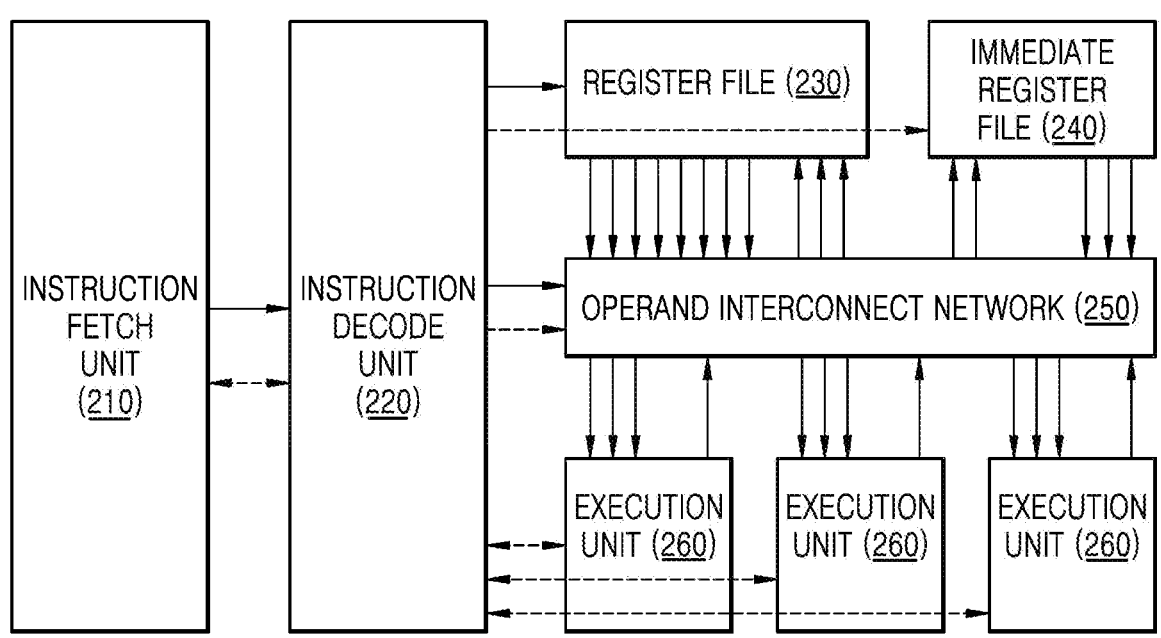
FIG. 2 is a block diagram of a structure of a device that performs an operation, according to some embodiments.

FIG. 2 is a block diagram of a structure of a device that performs an operation, according to an embodiment.

In FIG. 2, a solid line may indicate a flow of data, and a broken line may indicate a flow of a control signal.

The data processing device 110 may include at least one of an instruction fetch unit 210, an instruction decode unit 220, a register file 230, an immediate register file 240, an operand interconnect network 250, and execution units 260 shown in FIG. 2.

For example, the data processing device 110 may include the register file 230, the operand interconnect network 250, and the execution units 260. A detailed structure of the data processing device 110 will be described later with reference to FIG. 10.

The data processing device 110 may control at least one of the instruction fetch unit 210, the instruction decode unit 220, the register file 230, the immediate register file 240, the operand interconnect network 250, and the execution units 260.

The instruction fetch unit 210 may receive instructions which are to be executed, and may transmit the received instructions to the instruction decode unit 220. The instruction fetch unit 210 may receive the instructions which are to be executed, from a data storage medium. For example, the instruction fetch unit 210 may receive the instructions which are to be executed, from internal memory or external memory.

The instruction decode unit 220 may decode the received instructions and may control at least one of the register file 230, the operand interconnect network 250, and the execution units 260.

Alternatively, the instruction decode unit 220 may decode the received instructions to obtain signals, and may transmit the obtained signals to at least one of the register file 230, the operand interconnect network 250, and the execution units 260.

When a received instruction includes an immediate operand field, the instruction decode unit 220 may transmit a value of the immediate operand field to the operand interconnect network 250.

When the received instruction includes an operand field for storing an immediate value, the immediate operand field may be considered an immediate storage space of the received instruction.

The register file 230 may mean a register file that is used in common processors.

The register file 230 may be classified into the immediate register file 240 and a general register file. The immediate register file may mean a set of registers specialized to store an immediate value. The general register file may mean a register file other than the immediate register file. However, this classification is conceptual, and is not interpreted as limiting the present invention.

The immediate register file 240 may store an immediate value included in an instruction.

For example, when an instruction includes a portion of an immediate value, the data processing device 110 may store the portion of the immediate value included in the instruction in the immediate register file 240 and may use the stored portion of the immediate value to perform an operation.

When the immediate register file 240 is used, power consumption may be reduced, and the degree of freedom may be increased during encoding. Because the immediate register file 240 does not require many entries, the immediate register file 240 may be accessed with low power.

When the immediate register file 240 is used, a small storage space may be required to store an address field necessary for selecting a register entry. For example, a processor may be implemented using a general register file including 32 entries and an immediate register file including 4 entries.

The time required to perform an operation with respect to a predetermined capacity or more of immediate value when the number of entries included in the immediate register file 240 is less than that of entries included in a general register file may be determined based on the number of times an operation is performed with respect to the predetermined capacity or more of immediate value.

For example, the time required to perform an operation with respect to a predetermined capacity or more of immediate value when the number of entries included in the immediate register file 240 is less than that of entries included in a general register file may be equal to or similar to the time required to perform an operation with respect to the predetermined capacity or more of immediate value when the number of entries included in the immediate register file 240 is equal to that of entries included in the general register file.

As another example, based on the typical number of times an operation is performed with respect to a predetermined capacity or more of immediate value, the time required to perform the operation with respect to the predetermined capacity or more of immediate value when the number of entries included in the immediate register file 240 is less than that of entries included in a general register file may be equal to the time required to perform the operation with respect to the predetermined capacity or more of immediate value when the number of entries included in the immediate register file 240 is equal to that of entries included in the general register file.

The operand interconnect network 250 may provide input operands, which are to be used in an instruction, to the execution units 260, and may provide an output operand of the instruction to the register file 230. The operand interconnect network 250 may be a separate component as shown in FIG. 2, or may be included in the register file 230 or the execution units 260.

The operand interconnect network 250 may select one from among predetermined values according to a control signal of the instruction decode unit 220 and transmit the selected value as an operand input of the execution unit 260. For example, the operand interconnect network 250 may transmit an output of the register file 230, as the operand input of the execution unit 260. As another example, the operand interconnect network 250 may transmit an output of the immediate register file 240, as the operand input of the execution unit 260. As another example, the operand interconnect network 250 may transmit a value obtained by catenating a value provided by the immediate register file 240 with the immediate value provided by the instruction decode unit 220, as the operand input of the execution unit 260. As another example, the operand interconnect network 250 may transmit a value obtained by catenating a value provided by the register file 230 with the immediate value provided by the instruction decode unit 220, as the operand input of the execution unit 260. As another example, the operand interconnect network 250 may transmit a value obtained by catenating the value provided by the register file 230 with the value provided by the immediate register file 240, as the operand input of the execution unit 260.

A processor may support operand forwarding. An output of at least one execution unit 260 may be used as an input operand of the at least one execution unit 260.

The operand interconnect network 250 may transmit outputs of the execution units 260 to the register file 230 or the immediate register file 240, according to the control signal of the instruction decode unit 220. The instruction decode unit 250 may selectively further include a function of transmitting the outputs of the execution units 260 to the register file 230 or the immediate register file 240. For example, regardless of the control signal of the instruction decode unit 220, the operand interconnect network 250 may not perform the function of transmitting the outputs of the execution units 260 to the register file 230 or the immediate register file 240.

The execution units 260 may execute an instruction. For example, the execution units 260 may perform an operation according to an instruction of performing an operation. The execution units 260 may output a result of performing the operation.

The execution units 260 may have limits in the types of commands executable by the execution units 260.

For example, a first execution unit 260 may execute an MTII instruction, a MTI instruction, an instruction of receiving two register values as input operands, and an instruction of receiving one register value and one immediate value as input operands.

As another example, a second execution unit 260 may execute an MFI instruction, an instruction of receiving two register values as input operands, an instruction of receiving one register value and one immediate value as input operands, and an instruction of using, as an input, a value obtained by catenating an immediate value included in an instruction with a register value.

As another example, a third execution unit 260 may execute an instruction of receiving two register values as input operands, and an instruction of receiving one register value and one immediate value as input operands. In this case, the third execution unit 260 may not be connected to the immediate register file 240.

Figure 3A:
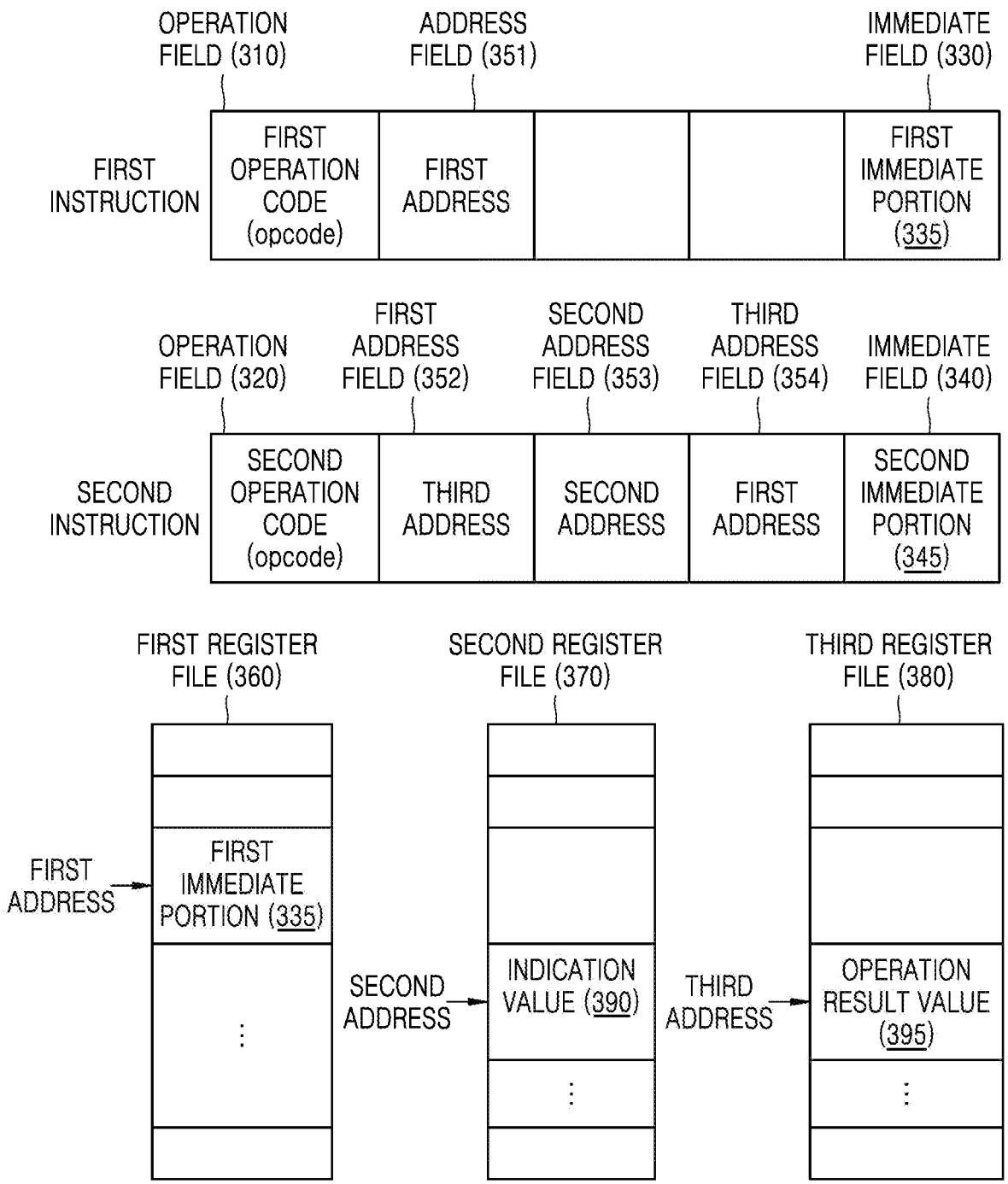
FIG. 3A is a schematic diagram for explaining a method of performing an operation with respect to an operand, according to some embodiments.
Figure 3B:
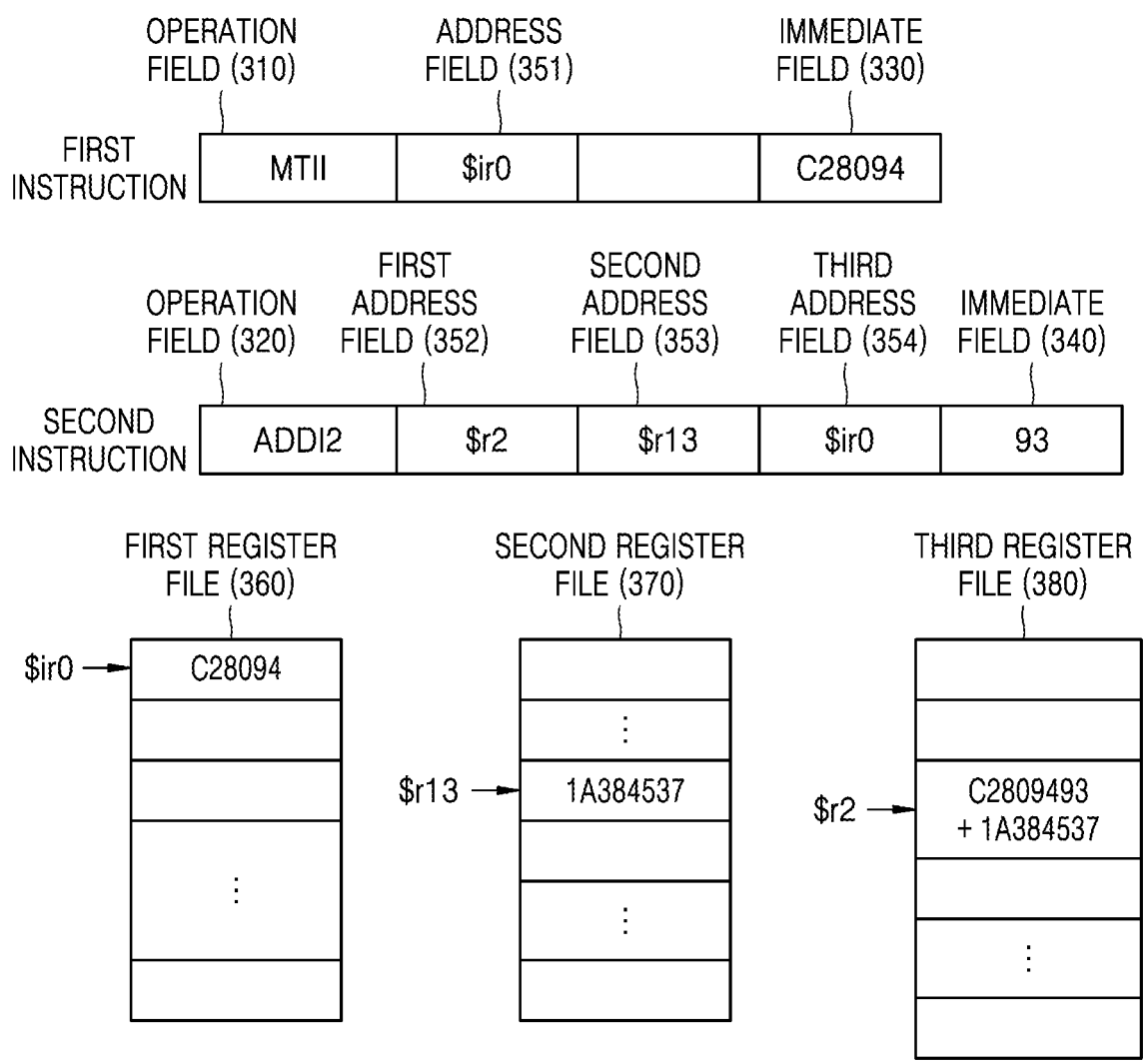
FIG. 3B is a schematic diagram for explaining a method of performing an add operation with respect to an operand, according to some embodiments.
Figure 3C:
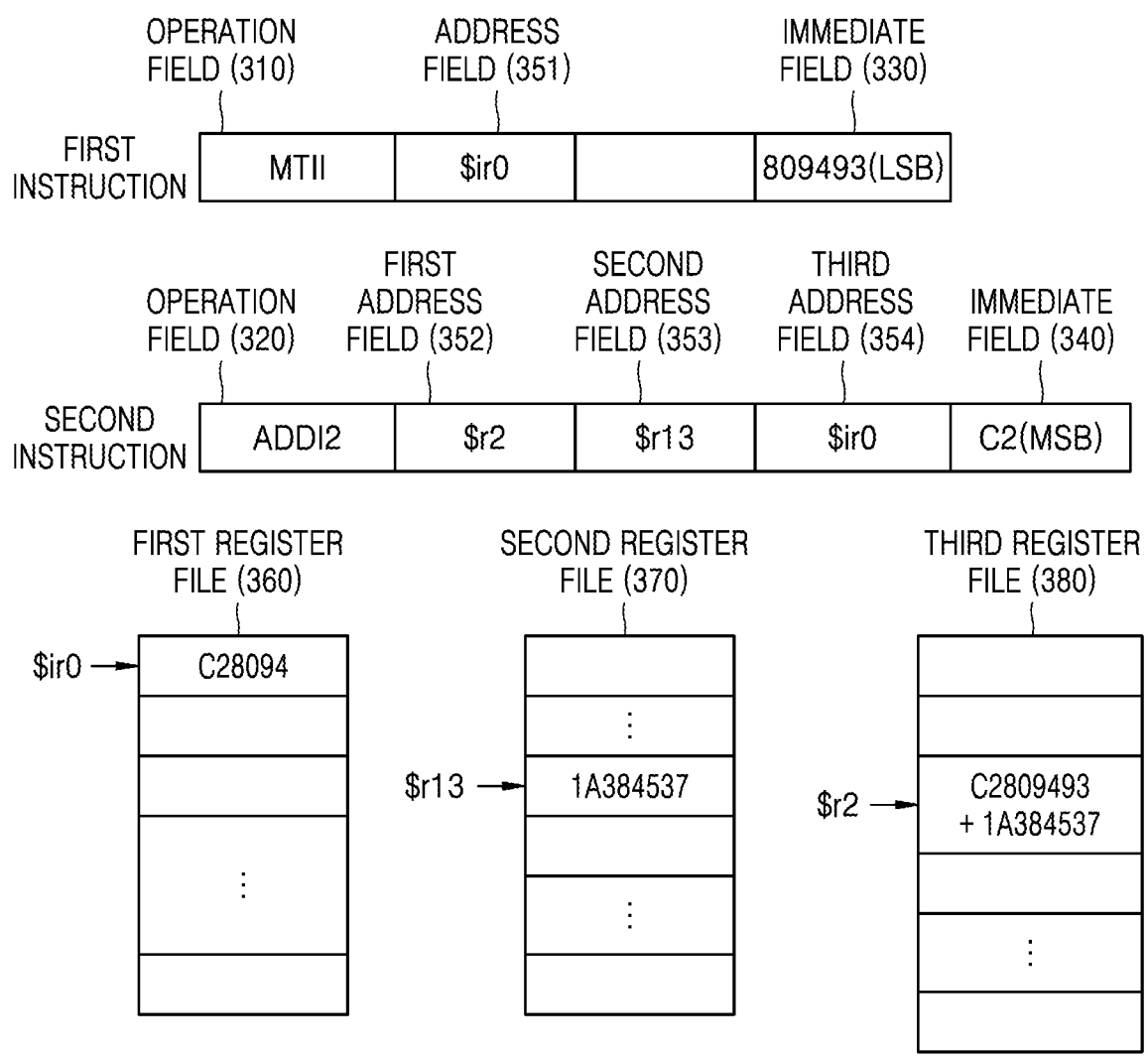
FIG. 3C is a schematic diagram for explaining a method of performing an add operation with respect to an operand, according to other embodiments.

FIGS. 3A, 3B and 3C are schematic diagrams for explaining a method of performing an operation, according to some embodiments. In FIGS. 3A, 3B and 3C, a first register file 360, a second register file 370, and a third register file 380 are examples of a storage medium, and not only a register file is used to store data. For example, cache memory may be used instead of the register file 230. As another example, DRAM may be used instead of the register file 230.

FIG. 3A is a schematic diagram for explaining a method of performing an operation with respect to an operand, according to some embodiments.

An example in which one or more instructions are executed will now be described.

An immediate field may mean a portion for storing an immediate value within an instruction.

An instruction may include a plurality of fields. For example, a first instruction may include at least one of an operation field 310, an address field 351, and an immediate field 330. As another example, a second instruction may include at least one of an operation field 320, a first address field 352, a second address field 353, a third address field 354, and an immediate field 340.

The operation field 310 included in the first instruction may include information about an operation of the first instruction. For example, based on the contents of the operation field 310, the data processing device 110 may store a first immediate portion 335 stored in the immediate field 330, in memory at a location corresponding to a first address stored in the address field 351. The memory at the location corresponding to the first address may be a register in the immediate register file 240 of FIG. 2. The register file 230 may be a set of a plurality of registers. The memory that stores the first immediate portion 335 therein may be a storage medium other than the register.

According to an embodiment, when the first immediate portion 335 is stored in the immediate register file 240, power consumption may be reduced, and the degree of freedom may be increased during encoding. Because the immediate register file 240 does not require many entries, the power required to access the immediate register file 240 may be small. When the immediate register file 240 is used, a small storage space may be required to store an address field necessary for selecting a register entry. For example, a processor may be implemented using a general register file including 32 entries and an immediate register file including 4 entries.

Connection between input/output ports of at least one immediate register file 240 and at least one execution unit 260 may be performed in any possible combination. For example, when all of the execution units 260 perform write operations, the execution units 260 may be set to write data to only register entries determined in the execution units 260, and, when all of the execution units 260 perform read operations, the execution units 260 may be set to read data from all of the register entries. As another example, the first execution unit 260 may be set to perform only a write operation on the immediate register file 240, and the second execution unit 260 may be set to perform both a write operation and a read operation on the immediate register file 240. As another example, the execution units 260 may have dedicated immediate register files 240, respectively. In this case, each register file 260 may have one entry.

An operation code located in an operation field of an instruction may be represented as an operational sign, a manipulation code, or the like, and may mean a code or symbol for representing the type of operation in a computer. For example, a symbol that specifies a predetermined operation may be the operation code.

When the first instruction is executed, the processor may perform an operation that is determined by a first operation code. An example in which the first instruction is executed will now be described.

The instruction decode unit 220 may recognize the first instruction. The first instruction may include a plurality of fields. For example, the first instruction may include the operation field 310, the address field 351, and the immediate field 330. The operation field 310 may store information about an operation performed by the first instruction, the address field 351 may store a memory address at which a predetermined value is stored, and the immediate field 330 may store a value of a portion of an immediate value. The instruction decode unit 220 may recognize an operation requested by the operation field 310 from among the plurality of fields of the first instruction. Based on the contents of the first operation code, the value of the first immediate portion 335 stored in the immediate field 330 may be stored in the storage space at the location corresponding to the first address stored in the address field 351. For example, the first address may indicate a register included in the first register file 360. Accordingly, the value of the first immediate portion 335 stored in the immediate field 330 of the first instruction may be stored in the register indicated by the first address within the first register file 360. The first register file 360 may mean the register file 230 or the immediate register file 240.

The value stored in the immediate field 330 may be transmitted to the operand interconnect network 250 so as to be stored in the storage space at the location corresponding to the address stored in the address field 351. The operand interconnect network 250 may receive an operand from at least one of the register file 230, the immediate register file 240, the instruction decode unit 220, and the execution units 260.

The first immediate portion 335, which is an output value of the instruction decode unit 220, may be transmitted as an input operand to a predetermined execution unit 260 via the operand interconnect network 250.

The execution unit 260 that has received the first immediate portion 335 may output the first immediate portion 335 as an output value, and the first immediate portion 335 may be input to the immediate register file 240. The instruction decode unit 220 may transmit, to the immediate register file 240, at least one control signal for writing a value to a 0-numbered entry (ir0) of the immediate register file 240. The control signals transmitted by the instruction decode unit 220 to the immediate register file 240 may be an address signal and a write enable signal.

The first instruction and the second instruction may be independently executed. However, to perform the entire operation, the second instruction may be executed based on execution of the first instruction. When the second instruction is executed, the processor may perform an operation that is determined by a second operation code. An example in which the second instruction is executed will now be described.

The instruction decode unit 220 may recognize the second instruction. The second instruction may include a plurality of fields. For example, the second instruction may include the operation field 320, the first address field 352, the second address field 353, the third address field 354, and the immediate field 340. The operation field 320 may store information about an operation performed by the second instruction. The address field 352, the second address field 353, and the third address field 354 may store the address of memory where a predetermined value is stored, and the immediate field 340 may store a value of a portion of the immediate value. The instruction decode unit 220 may recognize an operation requested by the operation field 320 from among the plurality of fields of the second instruction. Based on the contents of the second operation code, the image processing device 110 may determine an immediate value by catenating the value of a second immediate portion 345 stored in the immediate field 340 with the value of the first immediate portion 335 stored in the storage space at the location corresponding to a first address stored in the third address field 354. The immediate value may be obtained by catenating the first immediate portion 335 with the second immediate portion 345.

Based on the contents of the second operation code, the data processing device 110 may perform an operation by using, as operands, the immediate value determined by catenating the first immediate portion 335 with the second immediate portion 345 and the value stored in a second address stored in the second address field 353. The type of operation performed at this time may be determined based on the contents of the second operation code. For example, based on the contents of the second operation code, the data processing device 110 may add or multiply the immediate value determined by catenating the first immediate portion 335 with the second immediate portion 345 and an indication value 390 stored in the second address.

Based on the contents of the second operation code, the data processing device 110 may store an operation result value 395 determined by performing the operation, in a register corresponding to a third address stored in the first address field 352. The register corresponding to the third address may be a register included in the third register file 380.

The first register file 360, the second register file 370, and the third register file 380 may or may not be independent register files. For example, the first register file 360 and the third register file 380 may be immediate register files, and the second register file 370 may be a general register file other than an immediate register file.

Because the first immediate portion 335 is stored in a predetermined data storage space and then used as described above, when the stored first immediate portion 335 is used in another operation, the first immediate portion 335, which is a pre-stored value, may also be used during a plurality of operations.

Another example in which the second instruction is performed by the data processing device 110 will now be described. According to the present embodiment, the operand interconnect network 250 is used to transmit data.

The data processing device 110 may recognize the second instruction, and may transmit the second immediate portion 345, which is the value of the immediate field 340 included in the second instruction, to the operand interconnect network 250. The data processing device 110 may transmit control signals for reading the immediate register of a first address of the immediate register file 240 and the value of a second address of the register file 230, to respective register files (immediate register file and/or general register file).

The data processing device 110 may transmit the indication value 390, which is a 0-numbered input operand value indicated by the second instruction, to the operand interconnect network 250. For example, the data processing device 110 may transmit the indication value 390, which is an output value of the register file 230, as the 0-numbered input operand value to the operand interconnect network 250. The data processing device 110 may transmit the indication value 390 as a 0-numbered input operand from the operand interconnect network 250 to the execution unit 260.

The data processing device 110 may determine the immediate value by catenating the second immediate portion 345, which is the output value of the instruction decode unit 220, with the first immediate portion 335, which is the output value of the immediate register file 240, by using the operand interconnect network 250. The data processing device 110 may transmit the immediate value determined by the operand interconnect network 250 as a 1-numbered input operand to the execution unit 260.

In response to the determined immediate value, the execution unit 260 may add the value of the 0-numbered input operand to the value of the 1-numbered input operand and output a result of the addition.

The 0-numbered input operand and the 1-numbered input operand may be processed by different operand interconnect networks 250. However, according to settings, the 0-numbered input operand and the 1-numbered input operand may be processed by the same operand interconnect network 250.

The 0-numbered input operand and the 1-numbered input operand may be received by the same execution unit 260.

The execution unit 260 may receive the 0-numbered input operand and the 1-numbered input operand and perform an operation with respect to the received input operands to output a result of the operation. For example, the execution unit 260 may output a value obtained by adding the 0-numbered input operand to the 1-numbered input operand. As another example, the execution unit 260 may output a value obtained by multiplying the 0-numbered input operand by the 1-numbered input operand.

The execution unit 260 may transmit its output to the immediate register file 240 via the operand interconnect network 250. For example, the data processing device 110 may write an operation result value obtained from performing the operation to a third address of the register file 230. As another example, the instruction decode unit 220 may transmit control signals for writing the operation result value to the third address of the register file 230, to the register file 230 or the immediate register file 240.

The data processing device 110 may perform an operation in which the immediate value obtained by catenating the first immediate portion 335 with the second immediate portion 345 and the value stored in the storage space corresponding to the second address are used as operands, by using two instructions.

When the storage space that stores the first immediate portion 335 and the storage space that stores the indication value 390 are registers as shown in FIG. 3A, the speed of the operation may increase. Accordingly, the data processing device 110 may quickly perform an operation with respect to an immediate value that exceeds the capacity of the intermediate field 330 of the first instruction.

Moreover, when the storage space that stores the first immediate portion 335 and the storage space that stores the indication value 390 are registers as shown in FIG. 3A, the speed of an operation may more increase, as compared to a case where RAM is used to store the first immediate portion 335 and the indication value 390, because a register receives data faster than RAM. Accordingly, when registers are used when the data processing device 110 performs an operation by using two instructions, the power and time consumed to read memory may be reduced. Thus, the data processing device 110 may quickly perform an operation.

Moreover, the data processing device 110 may perform an operation with respect to a predetermined capacity or more of immediate value by using only two instructions. Simple instructions are used to perform an operation, and a short period of time is taken to execute the instructions used to perform the operation. Thus, the time, the power, the data, and the number of instructions required to perform an operation may be small.

A storage space capable of storing an immediate value within an instruction may be limited. For example, a storage space capable of storing an immediate value within the first instruction may be restricted to be within the immediate field 330. An immediate value storage space within an instruction may be limited. For example, when the size of the first instruction is fixed to 32 bits, various types of information necessary for executing an instruction need to be included in the 32 bits, and thus a space allocated to store the immediate value may be 24 or less bits. Because the data processing device 110 performs an operation by using the value determined by catenating the first immediate portion 335 with the second immediate portion 345, the data processing device 110 may perform an operation with respect to even a large capacity of immediate value that exceeds an intermediate value storage space allocated within an instruction. When the data processing device 110 performs an operation with respect to a large capacity of immediate value that exceeds an intermediate value storage space, only two instructions are used, and thus the operation may be performed at high speed. When the storage space that stores the first immediate portion 335 and the storage space that stores the indication value 390 are registers as shown in FIG. 3A, the speed of the operation may further increase.

The immediate value may be comprised of the first immediate portion 335 and the second immediate portion 345, and may be determined by catenating the first immediate portion 335 with the second immediate portion 345.

The immediate value may be divided into the first immediate portion 335 and the second immediate portion 345 according to various criteria. For example, 16 upper bits of the immediate value may become the first immediate portion 335, and 16 lower bits of the immediate value may become the second immediate portion 345. As another example, 12 upper bits of the immediate value may become the first immediate portion 335, and 20 lower bits of the immediate value may become the second immediate portion 345. As another example, 19 upper bits of the immediate value may become the first immediate portion 335, and 13 lower bits of the immediate value may become the second immediate portion 345. As another example, when the immediate value is formed by catenating the first immediate portion 335 with the second immediate portion 345, n upper bits of the immediate value may become the first immediate portion 335, and m lower bits of the immediate value may become the second immediate portion 345. As another example, when an immediate value is formed by catenating the first immediate portion 335 with the second immediate portion 345, x lower bits of the immediate value may become the first immediate portion 335, and y upper bits of the immediate value may become the second immediate portion 345.

An immediate value that is smaller than a basic unit in which a processor processes data may also be divided into the first immediate portion 335 and the second immediate portion 345 and used in the data processing device 110.

For example, the data processing device 110 may divide a 24-bit immediate value into an 18-bit first immediate portion 335 and a 6-bit second immediate portion 345 and may use the 18-bit first immediate portion 335 and the 6-bit second immediate portion 345 in a 32-bit processor.

A portion of the immediate value and the other portion of the immediate value may become the first immediate portion and the second immediate portion, respectively. Accordingly, values of the first immediate portion 335 or the second immediate portion 345 may not be consecutive bits. For example, odd-numberth values of the immediate value and even-numberth values of the immediate value may become the first immediate portion 335 and the second immediate portion 345, respectively.

The first instruction may include at least one of an MTII instruction, an MTI instruction, and an MFI instruction, and the second instruction may include at least one of an ADDI2 instruction and a MADI2 instruction.

FIG. 3B is a schematic diagram for explaining a method of performing an add operation with respect to an operand, according to some embodiments.

The first instruction may be a MTII instruction. The MTII instruction may include a plurality of fields. For example, the MTII instruction may include at least one of the operation field 310, the address field 351, and the immediate field 330.

When the MTII instruction is executed, the processor may perform an operation that is determined by the MTII instruction. An example in which the MTII instruction is executed will now be described.

The instruction decode unit 220 may recognize the MTII instruction. The MTII instruction may include a plurality of fields. For example, the MTII instruction may include the operation field 310, the address field 351, and the immediate field 330. The operation field 310 may store information about an operation performed by the MTII instruction, the address field 351 may store the address of a memory where a predetermined value is stored, and the immediate field 330 may store a value of a portion of an immediate value. The instruction decode unit 220 may recognize an operation requested by the operation field 310 from among the plurality of fields of the MTII instruction. Based on the contents of an operation code stored in the operation field 310, C28094 stored in the immediate field 330 may be stored in a storage space at a location corresponding to an address stored in the address field 351. For example, the address stored in the address field 351 may indicate a 0-numbered entry (ir0) of the immediate register file 240. Accordingly, C28094 stored in the immediate field 330 of the MTII instruction may be stored in the 0-numbered entry of the immediate register file 240. The immediate register file 240, in which C28094 is stored, may be the first register file 360. The C28094 stored in the immediate field 330 may be the value of a portion of the immediate value, and the immediate value may be one of a plurality of operands.

The C28094 stored in the immediate field 330 may be transmitted to the operand interconnect network 250 so as to be stored in the storage space at the location corresponding to the address stored in the address field 351. The operand interconnect network 250 may receive an operand from at least one of the register file 230, the immediate register file 240, the instruction decode unit 220, and the execution units 260.

C28094, which is an output value of the instruction decode unit 220, may be transmitted as an input operand to a predetermined execution unit 260 via the operand interconnect network 250.

The execution unit 260 that has received C28094 may output C28094 as an output value, and C28094 may be transmitted to the immediate register file 240. The instruction decode unit 220 may transmit, to the immediate register file 240, at least one control signal for writing a value to the 0-numbered entry (ir0) of the immediate register file 240. The control signals transmitted by the instruction decode unit 220 to the immediate register file 240 may be an address signal and a write enable signal.

The second instruction may be an ADDI2 instruction. The ADDI2 instruction may include a plurality of fields. For example, the ADDI2 instruction may include at least one of the operation field 320, the first address field 352, the second address field 353, the third address field 354, and the immediate field 340.

The MTII instruction and the ADDI2 instruction may be independently executed. However, to perform the entire operation, the ADDI2 instruction may be executed based on execution of the MTII instruction. When the ADDI2 instruction is executed, the processor may perform an operation that is determined by an operation code of the ADDI2 instruction. An example in which the ADDI2 instruction is executed will now be described.

The instruction decode unit 220 may recognize the ADDI2 instruction. The ADDI2 instruction may include a plurality of fields. For example, the ADDI2 instruction may include the operation field 320, the first address field 352, the second address field 353, the third address field 354, and the immediate field 340. The operation field 320 may store information about an operation performed by the ADDI2 instruction. The address field 352, the second address field 353, and the third address field 354 may store the addresses of memories at which predetermined values are stored. The immediate field 340 may store the value of a portion of an immediate value. The instruction decode unit 220 may recognize an operation requested by the operation field 320 from among the plurality of fields of the ADDI2 instruction. Based on the contents of an operation code of the ADDI2 instruction, the image processing device 110 may determine an immediate value by catenating 93 stored in the immediate field 340 with C28094 stored in a storage space at a location corresponding to an address stored in the third address field 354. Accordingly, the data processing device 110 may generate an immediate value of C2809493 by catenating C28094 with 93.

Based on the contents of the operation code of the ADDI2 instruction, the data processing device 110 may perform an operation by using, as operands, C2809493, which is the immediate value determined by catenating C28094 with 93, and 1A384537, which is a value stored in an address stored in the second address field 353. The type of operation performed at this time may be determined based on the contents of the operation code of the ADDI2 instruction. For example, the data processing device 110 may add C2809493, which is the immediate value determined by catenating C28094 with 93, to 1A384537, which is the value stored in the address stored in the second address field 353, based on the contents of the operation code of the ADDI2 instruction.

Based on the contents of the operation code of the ADDI2 instruction, the data processing device 110 may store DCB8D9CA(=C2809493+1A384537), which is an operation result value determined by performing the operation, in a register corresponding to an address stored in the first address field 352. For example, the data processing device 110 may store DCB8D9CA in a 2-numbered entry of the third register file 380.

The first register file 360, the second register file 370, and the third register file 380 may or may not be independent register files. For example, the first register file 360 and the third register file 380 may be immediate register files, and the second register file 370 may be a general register file other than an immediate register file.

Because C2809493 is stored in a predetermined data storage space and is used as described above, when the stored C2809493 is used in another operation, C2809493, which is a pre-stored value, may be shared during a plurality of operations.

Another example in which the ADDI2 instruction is performed by the data processing device 110 will now be described. According to the present embodiment, the operand interconnect network 250 is used to transmit data.

The data processing device 110 may recognize the ADDI2 instruction, and may transmit 93, which is the value of the immediate field 340 included in the ADDI2 instruction, to the operand interconnect network 250. The data processing device 110 may transmit control signals for reading the value of the 0-numbered entry (ir0) of the immediate register file 240 and the value of a 13-numbered entry (r13) of the register file 230, to respective register files.

The data processing device 110 may transmit 1A384537, which is a 0-numbered input operand value indicated by the ADDI2 instruction, to the operand interconnect network 250. For example, the data processing device 110 may transmit IA384537, which is an output value of the immediate register file 240, as the 0-numbered input operand value to the operand interconnect network 250. The data processing device 110 may transmit IA384537 as a 0-numbered input operand from the operand interconnect network 250 to the execution unit 260.

The data processing device 110 may determine C2809493 by catenating 93, which is the output value of the instruction decode unit 220, with C28094, which is the output value of the immediate register file 240, in the operand interconnect network 250. The data processing device 110 may transmit C2809493 determined by the operand interconnect network 250, as a 1-numbered input operand to the execution unit 260.

In response to C2809493, the execution unit 260 may add the value of the 0-numbered input operand to the value of the 1-numbered input operand and output a result of the addition.

The 0-numbered input operand and the 1-numbered input operand may be processed by different operand interconnect networks 250. However, according to settings, the 0-numbered input operand and the 1-numbered input operand may be processed by the same operand interconnect network 250.

The 0-numbered input operand and the 1-numbered input operand may be received by the same execution unit 260.

The execution unit 260 may receive the 0-numbered input operand and the 1-numbered input operand and perform an operation with respect to the received input operands to output a result of the operation. For example, the execution unit 260 may output a value obtained by adding the 0-numbered input operand to the 1-numbered input operand.

The execution unit 260 may transmit its output to the immediate register file 240 via the operand interconnect network 250. For example, the data processing device 110 may write an operation result value to a 2-numbered entry (r2) of the register file 230. As another example, the instruction decode unit 220 may transmit control signals for writing the operation result value to the 2-numbered entry (r2) of the register file 230, to the register file 230 or the immediate register file 240.

The data processing device 110 may perform an operation in which C2809493, which is the immediate value obtained by catenating C28094 with 93, and 1A384537, which is the value stored in the storage space corresponding to the address $r13 stored in the second address field 353, are used as operands, by using two instructions.

When the storage space that stores C2809493 and the storage space that stores 1A384537 are registers as shown in FIG. 3B, the speed of the operation may increase. Accordingly, the data processing device 110 may quickly perform an operation with respect to an immediate value that exceeds the capacity of the intermediate field 330 of the MTII instruction.

Moreover, when a storage space that stores data is a register other than RAM, the speed of an operation may increase, as compared with when RAM is used to store data, because a register receives data more quickly than RAM. Accordingly, when registers are used when the data processing device 110 performs an operation by using two instructions, the power and time consumed to read memory may be reduced. Thus, the data processing device 110 may quickly perform an operation.

Moreover, the data processing device 110 may perform an operation with respect to a predetermined capacity or more of immediate value by using only two instructions. Simple instructions are used to perform an operation, and a short period of time is taken to execute the instructions used to perform the operation. Thus, the time, the power, the data, and the number of instructions required to perform an operation may be small.

A storage space capable of storing an immediate value within an instruction may be limited. For example, a storage space capable of storing an immediate value within the MTII instruction may be restricted to be within the immediate field 330. An immediate value storage space within an instruction may be limited. For example, when the size of the MTII instruction is fixed to 32 bits, various types of information necessary for executing the MTII instruction need to be included in the 32 bits, and thus a space allocated to store an immediate value may be 24 or less bits. Because the data processing device 110 catenates two portions into which the immediate value is divided and performs an operation, the data processing device 110 may also perform an operation with respect to a large capacity of immediate value that exceeds an immediate value storage space allocated within an instruction. When the data processing device 110 performs an operation with respect to a large capacity of immediate value that exceeds an intermediate value storage space, only two instructions are used, and thus the operation may be performed at high speed. When a storage space indicated by an address $ir0 stored in the address field 351 and a storage space indicated by an address $ir13 stored in the second address field 353 are registers as shown in FIG. 3B, the speed of an operation may increase.

FIG. 3C is a schematic diagram for explaining a method of performing an add operation with respect to an operand, according to some embodiments.

Referring to FIG. 3C, a data processing method according to an embodiment include some of the matters illustrated in FIG. 3B. Although omitted hereinafter for brevity, descriptions of the matters illustrated in FIG. 3B is still applicable to the method of FIG. 3C.

In FIG. 3B, the value of the immediate field 330 of the first instruction is a portion corresponding to upper bits of the immediate value. In FIG. 3B, the value of the immediate field 340 of the second instruction is a portion corresponding to lower bits of the immediate value. For example, in FIG. 3B, when the value of the immediate field 330 of the first instruction is C28094 and the value of the immediate field 340 of the second instruction is 93, the immediate value may be C2809493.

However, in FIG. 3C, the value of the immediate field 330 of the first instruction is a portion corresponding to lower bits of the immediate value. In FIG. 3C, the value of the immediate field 340 of the second instruction is a portion corresponding to upper bits of the immediate value. For example, in FIG. 3C, when the value of the immediate field 330 of the first instruction is 809493 and the value of the immediate field 340 of the second instruction is C2, the immediate value may be C2809493.

The criteria for dividing an immediate value in FIGS. 3B and 3C are merely examples, and the data processing device 110 may divide an immediate value according to the other criteria. A portion of the immediate value and the other portion of the immediate value may become the first immediate portion and the second immediate portion, respectively. For example, odd-numberth values of the immediate value and even-numberth values of the immediate value may become the first immediate portion and the second immediate portion, respectively.

Operations performed by the data processing device 110 are not limited to particular types of operations, and the number of operands is not limited to two. The operations performed by the data processing device 110 may include the four fundamental arithmetic operations and operations corresponding to combinations of the four fundamental arithmetic operations. The number of operands may be three or more.

For example, the data processing device 110 may output a value obtained by dividing, by a second operand, a first operand determined by catenating the first immediate portion 335 with the second immediate portion 345.

As another example, the data processing device 110 may output a value obtained by subtracting, from the second operand, the first operand determined by catenating the first immediate portion 335 with the second immediate portion 345 and multiplying a result value of the subtraction by a third operand.

As another example, the data processing device 110 may output a value obtained by adding, to the second operand, the first operand determined by catenating the first immediate portion 335 with the second immediate portion 345 and adding 32 lower bits of a result value of the addition by the third operand.

As another example, the data processing device 110 may output a value obtained by multiplying, by the second operand, the first operand determined by catenating the first immediate portion 335 with the second immediate portion 345 and adding 32 lower bits of a result value of the multiplication by the third operand.

As another example, the data processing device 110 may output a value obtained by adding a first operand to a second operand and multiplying a result value of the addition by a third operand determined by catenating the first immediate portion 335 with the second immediate portion 345.

As another example, the data processing device 110 may output a value obtained by multiplying, by a second operand, a first operand determined by catenating the first immediate portion 335 with the second immediate portion 345 and, when a result value of the multiplication exceeds 32 bits, adding the result value of the multiplication by a third operand by using a 64-bit register.

Figure 4A:
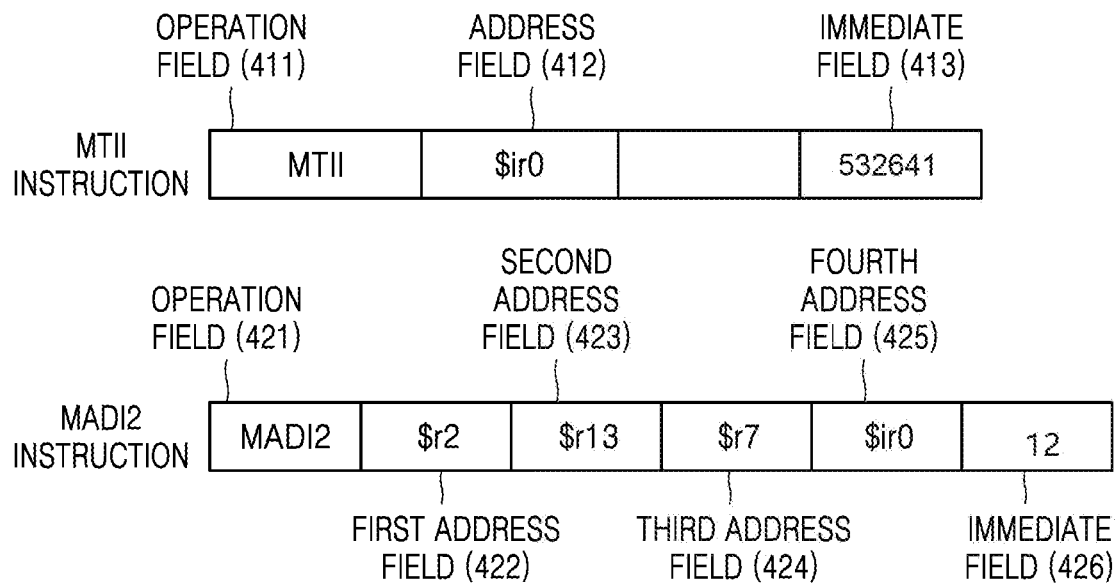
FIG. 4A is a schematic diagram for explaining a method of performing an operation with respect to an operand, according to some embodiments.
Figure 4B:
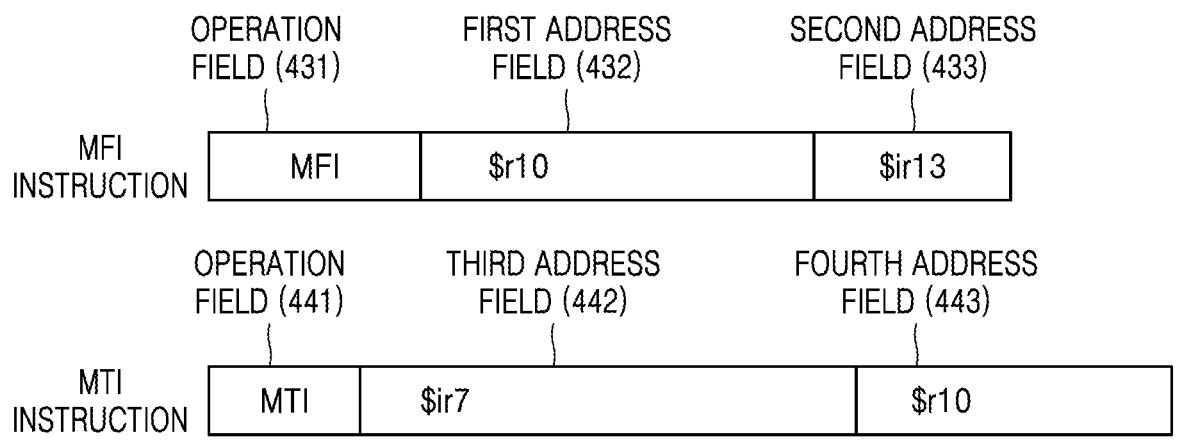
FIG. 4B is a schematic diagram for explaining a method of executing a predetermined instruction with respect to an operand, according to some embodiments.

FIGS. 4A and 4B are schematic diagrams for explaining a method of performing an operation with respect to an operand, according to some embodiments.

FIG. 4A is a schematic diagram for explaining a method of performing an operation of a MTII instruction and an operation of a MADI2 operation with respect to an operand, according to some embodiments.

The MTII instruction includes an operation field 411, an address field 412, and an immediate field 413. The MTII instruction may store a value stored in the immediate field 413 in a memory at a location corresponding to an address stored in the address field 412. For example, the MTII instruction may store 532641, which is the value stored in the immediate field 413, in a data storage space indicated by an address value $ir0 stored in the address field 412. The data storage space indicated by the address value $ir0 stored in the address field 412 may be a register included in a register file or an immediate register included in an immediate register file.

A detailed description of the MTII instruction may refer to the detailed matters described above with reference of FIG. 3B.

The MTII instruction and the MADI2 instruction may be independently executed. However, to perform the entire operation, the MADI2 instruction may be executed based on execution of the MTII instruction. When the MADI2 instruction is executed, the processor may perform an operation that is determined by an operation code of the MADI2 instruction. An example in which the MADI2 instruction is executed will now be described.

The instruction decode unit 220 may recognize the MADI2 instruction. The MADI2 instruction may include a plurality of fields. For example, the MADI2 instruction may include an operation field 421, a first address field 422, a second address field 423, a third address field 424, a fourth address field 425, and an immediate field 426. The operation field 421 may store information about an operation performed by the MADI2 instruction. The address field 422, the second address field 423, the third address field 424, and the fourth address field 425 may store the addresses of memories at which predetermined values are stored. The immediate field 426 may store the value of a portion of an immediate value. The instruction decode unit 220 may recognize an operation requested by the operation field 421 from among the plurality of fields of the MADI2 instruction. Based on the contents of an operation code of the MADI2 instruction, the image processing device 110 may determine an immediate value by catenating 12, which is a value stored in the immediate field 426, with 532641, which is a value stored in a storage space at a location corresponding to an address stored in the fourth address field 425. For example, the data processing device 110 may determine an immediate value of 12532641 by catenating 532641 with 12. As another example, when the value stored in the intermediate field 413 is upper bits, the data processing device 110 may determine an immediate value of 53264112 by catenating 532641 with 12.

Based on the contents of the operation code of the MADI2 instruction, the data processing device 110 may perform an operation by using, as operands, 12532641, which is the immediate value determined by catenating 532641 with 12, and a value stored in an address ($r7) stored in the third address field 424. The type of operation performed at this time may be determined based on the contents of the operation code of the MADI2 instruction. For example, based on the contents of the operation code of the MADI2 instruction, the data processing device 110 may multiply 12532641, which is the immediate value determined by catenating 532641 with 12, by the value stored in the address ($r7) stored in the third address field 424.

Based on the contents of the operation code of the MADI2 instruction, the data processing device 110 may add a result value of the multiplication to a value stored in a register corresponding to the address stored in the second address field 423.

For example, when the value stored in the address ($r7) stored in the third address field 424 is 00000002, the data processing device 110 may determine the result value of the multiplication as 24A64C82 (=12532641×00000002) and may add 24A64C82 to the value stored in the register corresponding to the address stored in the second address field 423. A result value of the addition may be stored in a register corresponding to an address stored in the first address field 422.

As another example, when the result value of the multiplication exceeds 32 bits, the data processing device 110 may add 32 lower bits of the result value of the multiplication to the value stored in the register corresponding to the address stored in the second address field 423. The data processing device 110 may store a result value of the addition in the register corresponding to the address stored in the first address field 422.

As another example, when the result value of the multiplication exceeds 32 bits, the data processing device 110 may store the result value of the multiplication by using a 64-bit register. The result value of the multiplication may be added to the value stored in the register corresponding to the address stored in the second address field 423. The data processing device 110 may store a result value of the addition in a 64-bit register corresponding to the address stored in the first address field 422.

Storage spaces corresponding to the addresses stored in the first address field 422, the second address field 423, the third address field 424, and the fourth address field 425 are not limited to register files. For example, the storage spaces corresponding to the addresses stored in the first address field 422, the second address field 423, the third address field 424, and the fourth address field 425 may include the register file 230, the immediate register file 240, cache memory, DRAM, and RAM.

The data processing device 110 may perform an operation in which an immediate value obtained by catenating the value of a portion of an immediate value stored in the immediate field 413 with the value of a portion of an immediate value stored in the immediate field 426, a value stored in the storage space corresponding to the address ($r7) stored in the third address field 424, and a value stored in the storage space corresponding to the address ($r13) stored in the second address field 423 are used as operands, by using two instructions.

When the storage spaces that store the above values are registers, the speed of an operation may increase. Accordingly, the data processing device 110 may quickly perform an operation with respect to an immediate value that exceeds the capacity of the intermediate field 413 of the MTII instruction or the intermediate field 426 of the MAD2 instruction.

Moreover, when a storage space that stores data is a register other than RAM, the speed of an operation may increase, as compared with when RAM is used to store data, because a register receives data more quickly than RAM. Accordingly, when registers are used when the data processing device 110 performs an operation by using two instructions, an operation may be more quickly performed than when RAM is used.

FIG. 4B is a schematic diagram for explaining a method of performing an MFI instruction and an MTI instruction with respect to an operand, according to some embodiments.

The MFI instruction and the MTI instruction may be selectively used in the data processing device 110. The MFI instruction and the MTI instruction may be used in exceptional situations of the processor or when the processor performs an interruption process. For example, the MFI instruction and the MTI instruction may perform data backup and restoration. As another example, when a situation that interrupts a normal operation of the processer occurs, the MFI instruction and the MTI instruction may be used.

The MFI instruction may perform a function related with backup. An example of an operation of the MFI instruction will now be described.

The MFI instruction may include a plurality of fields. For example, the MFI instruction may include at least one of an operation field 431, an address field 432, and an immediate field 433.

The data processing device 110 may store a value of the immediate register file 240 in a general register file. For example, the MFI instruction may store a value stored in a storage space corresponding to an address ($ir3) stored in the second address field 433, in a storage space corresponding to an address ($r10) stored in the first address field 432. The storage space corresponding to the address ($ir3) stored in the second address field 433 may be the immediate register file 240, and the storage space corresponding to the address ($r10) stored in the first address field 432 may be the general register file. Accordingly, according to the MFI instruction, the data processing device 110 may store the value of the immediate register file 240 in the general register file.

Accordingly, the MFI instruction may perform a function of backing up the value of the immediate register file 240 in the general register file.

The MTI instruction may perform a function related with restoration. An example of an operation of the MTI instruction will now be described.

The MTI instruction may include a plurality of fields. For example, the MTI instruction may include at least one of an operation field 441, a third address field 442, and a fourth address 443.

The data processing device 110 may store a value of the general register file in the immediate register file 240. For example, the MTI instruction may store a value stored in a storage space corresponding to an address ($r10) stored in the fourth address field 443, in a storage space corresponding to an address ($ir7) stored in the third address field 442. The storage space corresponding to the address ($r10) stored in the fourth address field 443 may be the general register file, and the storage space corresponding to the address ($ir7) stored in the third address field 442 may be the immediate register file 240. Accordingly, according to the MTI instruction, the data processing device 110 may store the value of the general register file in the immediate register file 240.

Accordingly, the MTI instruction may perform a function of restoring the value of the general register file in the immediate register file 240.

The embodiments of FIGS. 3 and 4 are applicable to executions of not only the ADDI2 instruction or the MADI2 instruction but also all instructions for performing an operation with respect to an operand.

Figure 5:
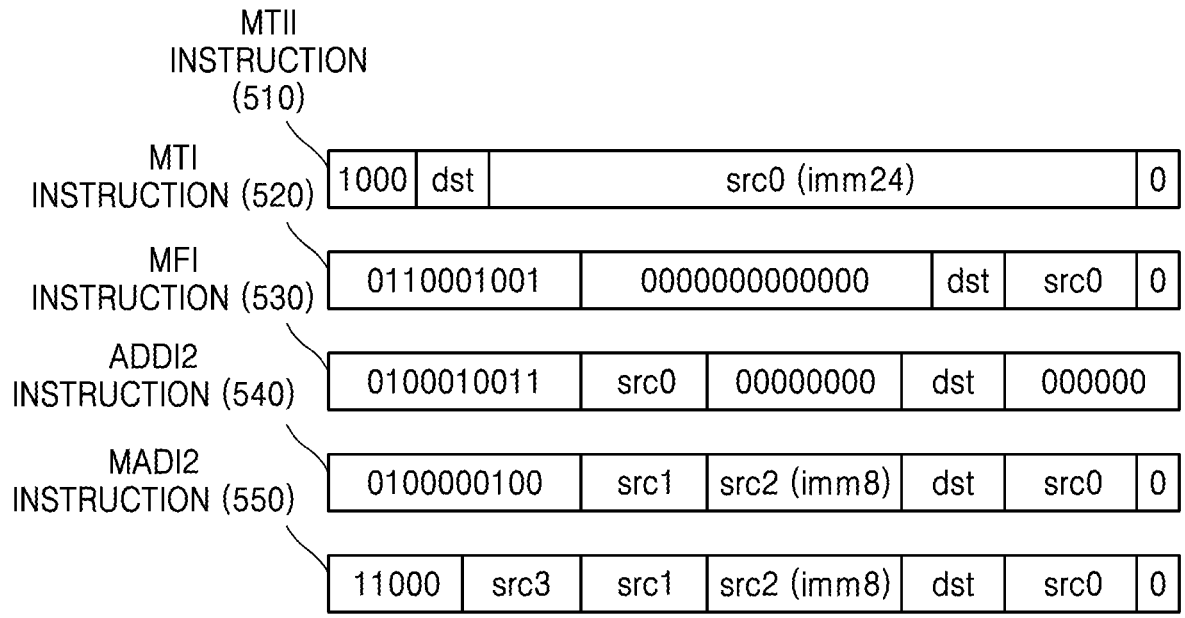
FIG. 5 is a block diagram of instructions for use in some embodiments.

FIG. 5 is a block diagram of instructions for use in some embodiments.

An MTII instruction 510 may store a value stored in the MTII instruction 510, in a register. For example, the MTII instruction 510 may store the value of an immediate field included in the MTII instruction 510, in a register. In the MTII instruction 510, src0 may be a field indicating the value of an input operand. A width of src0 may be equal to that of a register or an immediate register. For example, an immediate register may have a width of 24 bits.

The MTII instruction 510 may store the value of the immediate field of the MTII instruction 510, in the immediate register file 240. In the MTII instruction 510, src0 may indicate the value of an input operand. The field src0 may be a field that stores the value of the input operand. In the MTII instruction 510, dst may indicate the address of an immediate register corresponding to an output operand. The field dst may be a field for storing the address of the immediate register that stores an immediate value. A width of the field src0 may be equal to that of an immediate register. For example, an immediate register may have a width of 24 bits.

The MFI instruction 530 may perform a function related with backup.

The MTI instruction may perform a function related with restoration.

Detailed operations of the MTI instruction 520 and the MFI instruction 530 have been described above with reference to FIG. 4B.

An ADDI2 instruction 540 may use, as an input, a value obtained by catenating an immediate value included in the instruction with a value of a register file.

In the ADDI2 instruction 540, src0 may indicate the address of a register having an input operand stored therein. For example, the field src0 may be a field that indicates the address of a general register or immediate register having a first input operand stored therein.

In the ADDI2 instruction 540, src1 may be the address of a register having a portion of the input operand stored therein. For example, the filed src1 may be a field that indicates the address of an immediate register having a value corresponding to 24 upper bits of a second input operand stored therein. As another example, src1 may be a field that indicates the address of a general register having a value corresponding to 12 lower bits of the second input operand stored therein.

In the ADDI2 instruction 540, src2 may be the value of a portion of the input operand. For example, src2 may be a field that stores a value corresponding to 8 lower bits of the second input operand stored therein. As another example, src2 may be a field that stores a value corresponding to 12 upper bits of the second input operand stored therein.

The data processing device 110 may obtain the value of the first input operand stored in the address stored in the field src0. The data processing device 110 may determine an immediate value, being the second input operand, by catenating a portion of the immediate value stored in the field src1 with a portion of the immediate value stored in the field src2. The data processing device 110 may determine a result value by adding a first operand to a second operand. The result value determined by adding the two operands may be a value corresponding to an output operand.

In the ADDI2 instruction 540, dst may be the address of a register in which the value corresponding to the output operand is to be stored. For example, the field dst may be a field that indicates the address of a general register or immediate register in which a result value of the operation is to be stored.

A MADI2 instruction 550 may be executed based on execution of a MTII instruction. The MADI2 instruction may include a plurality of fields. For example, the MADI2 instruction may include an operation field, a first address field (src3), a second address field (src1), a third address field (src2 (imm8)), a fourth address field (dst), and an immediate field (src0). Detailed operations of the MADI2 instruction 550 have been described above with reference to FIG. 4A.

Figure 6A:
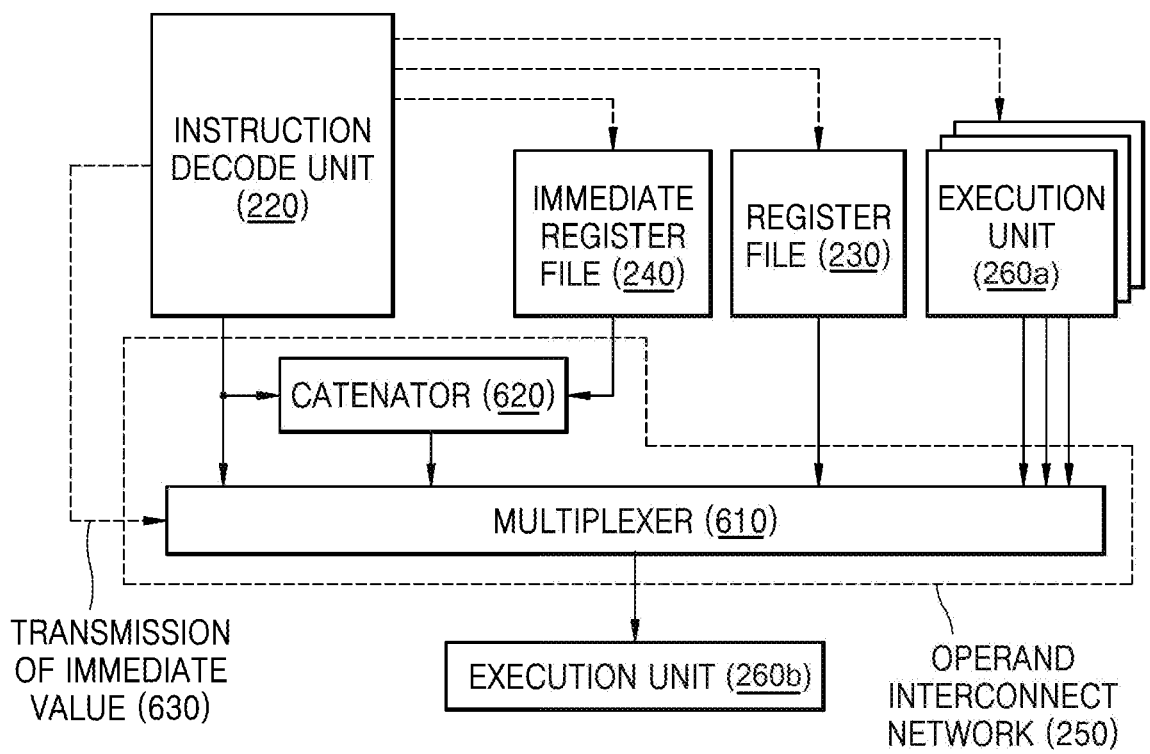
FIG. 6A is a block diagram for explaining a process of transmitting an operand, according to some embodiments.
Figure 6B:
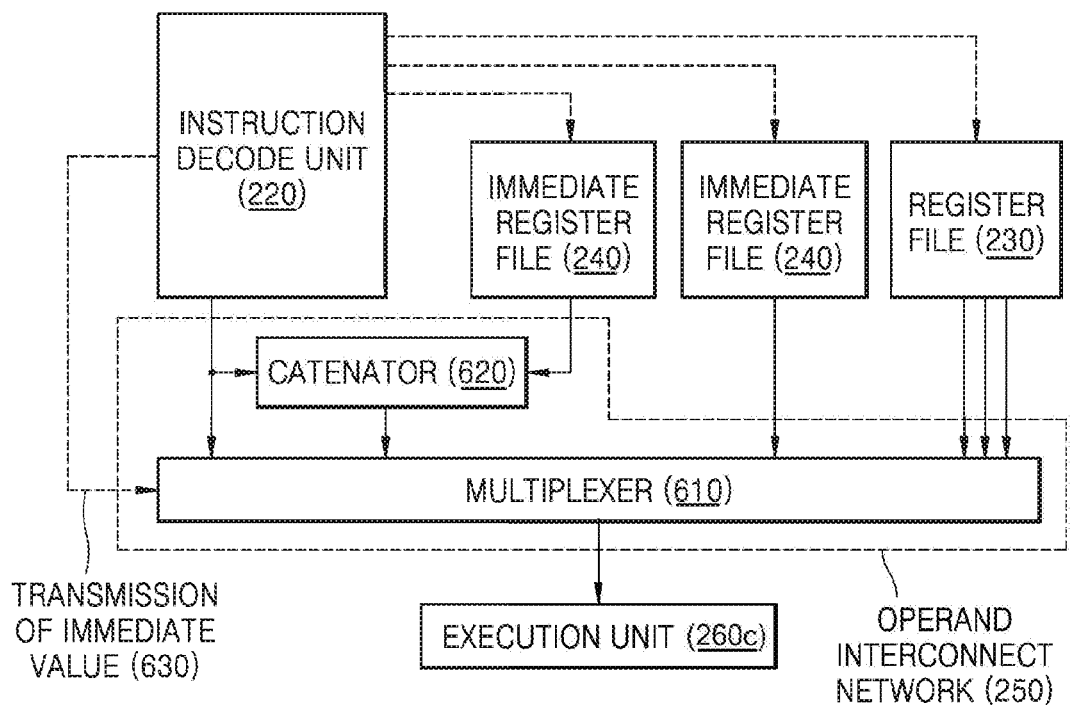
FIG. 6B is a block diagram for explaining a process of transmitting an operand, according to other embodiments.

FIGS. 6A and 6B are block diagrams for explaining a process of transmitting an operand, according to some embodiments. In detail, FIGS. 6A and 6B illustrate a portion of an operand interconnect network for providing an operand to input operand ports of execution units therein, according to some embodiments.

The operand interconnect network 250 may include a catenator 620 and a multiplexer 610. When the instruction decode unit 220 decodes an instruction and determines that the instruction includes an immediate field, the instruction decode unit 220 may transmit an immediate value stored in the immediate field or an extension of the immediate value stored in the immediate field to the operand interconnect network 250, as indicated in FIGS. 6A and 6B by broken line 630. The general register file and the immediate register file 240 may transmit an input operand necessary for executing the instruction, according to a control signal of the instruction decode unit 220.

The catenator 620 may generate a new value by catenating a plurality of received values. For example, the catenator 620 may generate a new signal by catenating a first signal received from at least one of the instruction decode unit 220, the immediate register file 240, the register file 230, the general register file, and an execution unit with a second signal received from at least one of the instruction decode unit 220, the immediate register file 240, the register file 230, the general register file, and the execution unit. As another example, the catenator 620 may generate a new 32-bit signal by catenating 8 specific bits transmitted by the instruction decode unit 220 with a 24-bit value transmitted by the immediate register file 240. As another example, the catenator 620 may generate a new 24-bit signal by catenating 12 lower bits transmitted by the instruction decode unit 220 with upper 12 bits transmitted by the general register file. As another example, the catenator 620 may generate a new 32-bit signal by catenating 8 specific bits transmitted by the instruction decode unit 220 with a 24-bit value transmitted by the execution unit. As another example, the catenator 620 may generate a new 32-bit signal by catenating 8 specific bits transmitted by the immediate register file 240 with the 24-bit value transmitted by the immediate register file 240.

The multiplexer 610 may transmit one of all types of inputs that may be used by the input operand ports of one or more execution units, according to the control signal of the instruction decode unit 220. For example, the multiplexer 610 may transmit, to the one or more execution units, one among inputs received from at least one of the catenator 620, the instruction decode unit 220, the immediate register file 240, the register file 230, the general register file, and the one or more execution units.

The operand interconnect network 250 may receive and process a value and transmit the processed value. FIGS. 6A and 6B illustrate an embodiment in which a plurality of units are connected to the operand interconnect network 250.

For example, in FIG. 6A, the instruction decode unit 220, the immediate register file 240, the register file 230, and one or more of execution units 260*a* and 260*b* transmit signals to the operand interconnect network 250.

As shown in FIG. 6A, an input of the multiplexer 610 is connected to an output of the one or more of the execution units 260*a* and 260*b* in order to support operand forwarding.

Forwarding may mean direct transmission of a signal. For example, forwarding may mean that a value determined by the one or more of the execution units 260*a* and 260*b* is used directly as an input of the multiplexer 610 without passing through the other modules.

As another example, in FIG. 6B, the instruction decode unit 220, two immediate register files 240, and the register file 230 transmit signals to the operand interconnect network 250.

As another example, the operand interconnect network 250 may receive an input from at least one of the instruction decode unit 220, the immediate register files 240, the register file 230, the general register file, and an execution unit 260*c*.

Figure 7:
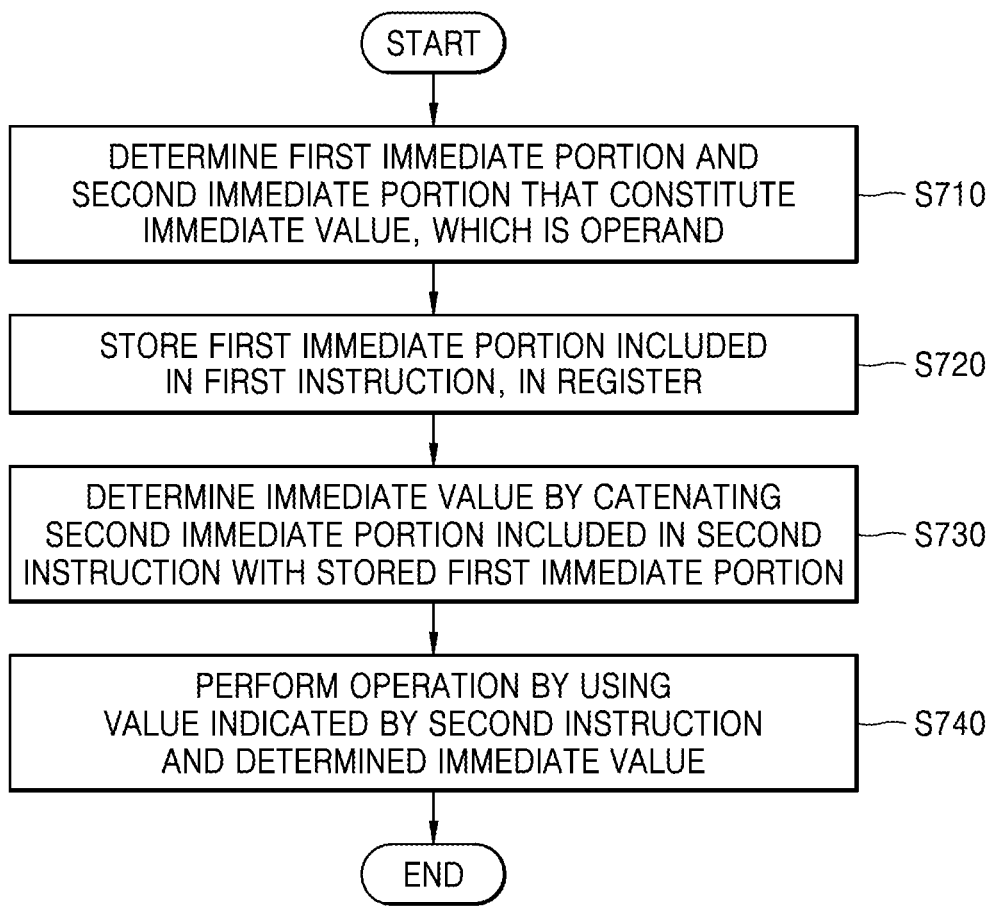
FIG. 7 is a schematic diagram for explaining a method of performing an operation by using a value indicated by a second instruction and an immediate value, according to some embodiments.
Figure 8:
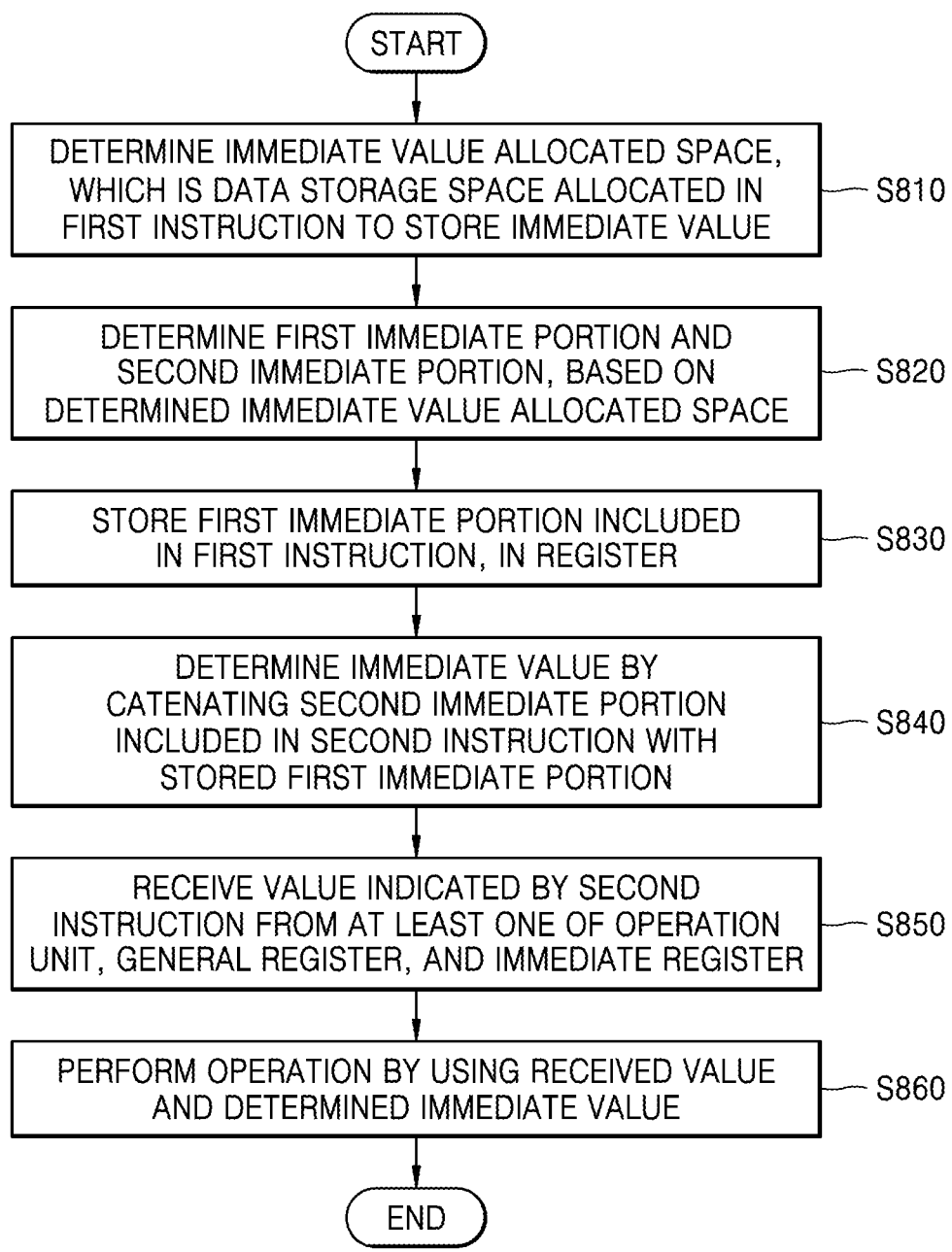
FIG. 8 is a flowchart of a method of performing an operation by determining a first immediate portion and a second immediate portion that constitute an immediate value and receiving a value indicated by a second instruction, according to some embodiments.
Figure 9:
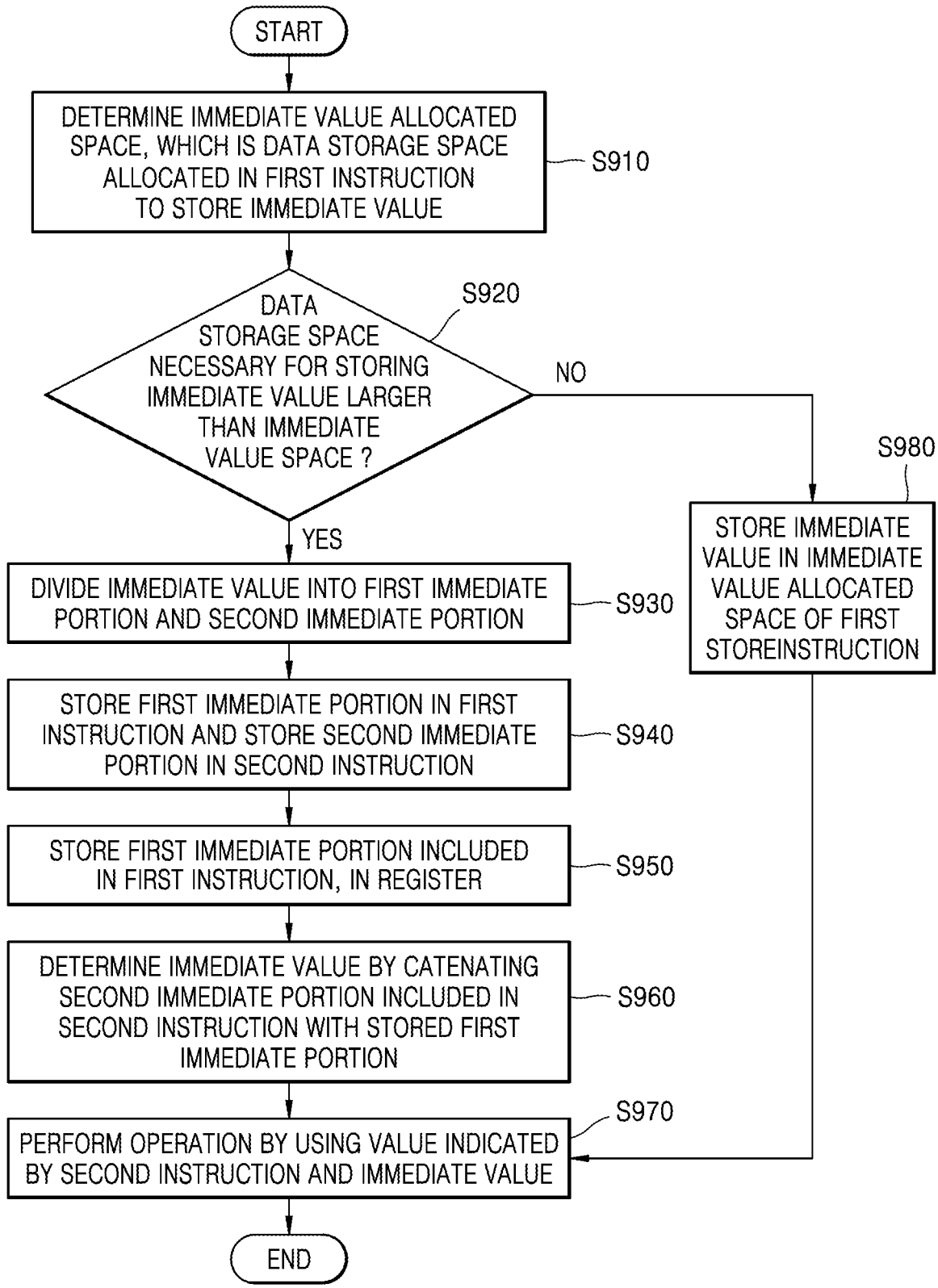
FIG. 9 is a flowchart of a method of performing an operation by determining the first immediate portion and the second immediate portion, based on a data storage space allocated within an instruction to store the immediate value, according to some embodiments.

FIGS. 7-9 are flowcharts of data processing methods according to some embodiments. The data processing methods are methods of implementing the data processing device 110, and some or all embodiments implementable by the data processing device 110 may be performed.

FIG. 7 is a flowchart of a method of performing an operation by using a value indicated by a second instruction and an immediate value, according to some embodiments.

The data processing device 110 may perform an operation by using a first instruction and the second instruction. The first instruction according to an embodiment may include at least one of an MTII instruction, an MTI instruction, and an MFI instruction. The second instruction according to an embodiment may include at least one of an ADDI2 instruction and an MADI2 instruction. However, the present embodiment is merely an embodiment, and the second instruction may be an instruction other than the ADDI2 instruction and the MADI2 instruction.

As described above, the types of the first instruction and the second instruction and the number of operands are not limited.

In operation S710, the data processing device 110 determines a first immediate portion and a second immediate portion that constitute an immediate value, which is an operand.

To determine the first immediate portion and the second immediate portion, first, the data processing device 110 may determine an immediate value allocated space, which is a data storage space allocated within the first instruction to store the immediate value, and may determine the first immediate portion and the second immediate portion based on the determined immediate value allocated space.

When the data processing device 110 determines the first immediate portion and the second immediate portion based on the determined immediate value allocated space, the data processing device 110 may determine the first immediate portion such that a data storage space required to store the first immediate portion is equal to the immediate value allocated space.

The data processing device 110 may determine the immediate value allocated space, which is the data storage space allocated within the first instruction to store the immediate value, and may determine the first immediate portion and the second immediate portion when a data storage space required to store the immediate value is larger than the determined immediate value allocated space. When the data storage space required to store the immediate value is smaller than the immediate value allocated space, the data processing device 110 may not divide the immediate value into the first immediate portion and the second immediate portion.

The data processing device 110 may determine the number of bits required to store the first immediate portion and the number of bits required to store the second immediate portion. A detailed method of the determination may be previously determined. For example, the number of bits required to store the first immediate portion may be equal to the number of bits allocated within the first instruction to store the immediate value.

An additional method of determining the first immediate portion and the second immediate portion will be described later with reference to FIG. 9.

In operation S720, the data processing device 110 stores the first immediate portion included in the first instruction, in a register. The register that stores the first immediate portion may include the immediate register 240.

The first immediate portion may be stored in a storage medium other than the register, and a detailed description thereof have been described above. For example, the register file 230 and the immediate register file 240 have been described above with reference to FIG. 2, and it was mentioned above with reference to FIGS. 3A, 3B and 3C that the storage medium may be cache memory, DRAM, or the like.

In operation S730, the data processing device 110 determines an immediate value by catenating the second immediate portion included in the second instruction with the stored first immediate portion.

When the first immediate portion and the second immediate portion are catenated, the immediate value may be determined. A method of catenating the first immediate portion and the second immediate portion have been described above with reference to FIGS. 3A and 3B.

In operation S740, the data processing device 110 performs an operation by using the value indicated by the second instruction and the immediate value determined in operation S730.

The value indicated by the second instruction may be an immediate value included in the second instruction. The value indicated by the second instruction has already been described above.

The data processing device 110 may perform an operation by using a value stored in a register having an address included in the second instruction and the immediate value determined in operation S730.

Operations performed by the data processing device 110 are not limited to particular types of operations, and the number of operands is not limited to two. The operations performed by the data processing device 110 may include the four fundamental arithmetic operations and operations corresponding to combinations of the four fundamental arithmetic operations. The number of operands may be three or more. A detailed example has been described above with reference to FIG. 3C.

The data processing device 110 may perform an operation by using values stored in registers corresponding to a plurality of addresses included in the second instruction and the immediate value determined in operation S730.

FIG. 8 is a flowchart of a method of performing an operation by determining the first immediate portion and the second immediate portion that constitute the immediate value and receiving the value indicated by the second instruction, according to some embodiments.

In operation S810, the data processing device 110 determines an immediate value allocated space, which is a data storage space allocated in the first instruction to store the immediate value.

The first instruction may include the data storage space allocated to store the immediate value. The data storage space allocated to store the immediate value may be previously determined in the first instruction. For example, when the first instruction is 32 bits, a space capable of storing the immediate value within the first instruction may be 24 bits. Some of the total bits of the first instruction may be allocated to store the immediate value.

The data processing device 110 may check how large the data storage space allocated to store the immediate value is within the first instruction.

In operation S820, the data processing device 110 determines the first immediate portion and the second immediate portion, based on the immediate value allocated space determined in operation S810.

For example, only when the number of bits required to store the immediate value is greater than the number of bits allocated within the first instruction to store the immediate value, the data processing device 110 may divide the immediate value into the first immediate portion and the second immediate portion. In this case, the first immediate portion to be stored in the first instruction may have a number of bits enough to be stored in the data storage space allocated in the first instruction to store the immediate value. Alternatively, the first immediate portion to be stored in the first instruction may have the same number of bits as the number of bits required to store the immediate value within the first instruction. In this case, when the first immediate portion is stored in the first instruction, the immediate value storage space allocated in the first instruction is fully filled with the first immediate portion, and thus an additional available space for storing the immediate value may not be secured.

For example, when a storage space allocated within the first instruction to store the immediate value is 8 bits and the immediate value, which is an operand, is 12 bits, the first immediate portion may be determined to be 8 bits, and the second immediate portion may be determined to be 4 bits. When the first immediate portion is stored in the first instruction, no additional available spaces for storing the immediate value may be left within the first instruction.

A portion of the immediate value that is other than the first immediate portion may be the second immediate portion.

Since operations S830 and S840 correspond to operations S720 and S730, respectively, detailed descriptions thereof will be omitted herein for the sake of brevity.

In operation S850, the data processing device 110 receives the value indicated by the second instruction from at least one of an operation unit, a general register, and an immediate register. However, this is merely an embodiment, and embodiments of the present invention are not limited thereto.

For example, the value indicated by the second instruction may be received from at least one of the catenator 620, the instruction decode unit 220, the immediate register files 240, the register file 230, the general register file, and the execution unit. In this case, the value stored in a register corresponding to the address of the register file 230 stored in a predetermined field of the second instruction may be an operand for performing an operation.

In operation S860, the data processing device 110 performs an operation by using the value received in operation S850 and the immediate value determined in operation S840.

A method of performing the operation has been described above.

FIG. 9 is a flowchart of a method of performing an operation by determining the first immediate portion and the second immediate portion, based on a data storage space allocated within an instruction to store the immediate value, according to some embodiments.

The data processing device 110 may perform an operation by using a first instruction and a second instruction. When an operation is performed with respect to an immediate value that is larger than a space capable of storing an immediate value, which is allocated in an instruction, the data processing device 110 may divide the immediate value into the first immediate portion and the second immediate portion. FIG. 9 explains, in particular, an embodiment of a method of dividing the immediate value into the first immediate portion and the second immediate portion.

The immediate value may include the first immediate portion and the second immediate portion, and the data processing device 110 may obtain the immediate value by catenating the first immediate portion and the second immediate portion.

In operation S910, the data processing device 110 determines an immediate value allocated space, which is a data storage space allocated in the first instruction to store the immediate value.

The first instruction may include the data storage space allocated to store the immediate value. The data storage space allocated to store the immediate value may be previously determined in the first instruction. For example, when the first instruction is 32 bits, a space capable of storing the immediate value within the first instruction may be 24 bits. Some of the total bits of the first instruction may be allocated to store the immediate value.

The data processing device 110 may check how large the data storage space allocated to store the immediate value is within the first instruction.

In operation S920, the data processing device 110 determines whether a data storage space necessary for storing the immediate value is larger than an immediate value space.

The data processing device 110 may check whether the immediate value is able to be stored in the data storage space of the first instruction. For example, the data processing device 110 may determine which one is greater from among the number of bits required to store the immediate value with the number of bits allocated within the first instruction to store the immediate value.

In operation S930, the data processing device 110 may divide the immediate value into the first immediate portion and the second immediate portion.

For example, when the number of bits required to store the immediate value is greater than the number of bits allocated within the first instruction to store the immediate value, the data processing device 110 may divide the immediate value into the first immediate portion and the second immediate portion. In this case, the first immediate portion to be stored in the first instruction may have a number of bits enough to be stored in the data storage space allocated in the first instruction to store the immediate value. Alternatively, the first immediate portion to be stored in the first instruction may have the same number of bits as the number of bits required to store the immediate value within the first instruction. In this case, when the first immediate portion is stored in the first instruction, the immediate value storage space allocated within the first instruction is fully filled with the first immediate portion, and thus an additional available space for storing the immediate value may not be secured.

For example, when a storage space allocated within the first instruction to store the immediate value is 8 bits and the immediate value, which is an operand, is 12 bits, the first immediate portion may be determined to be 8 bits, and the second immediate portion may be determined to be 4 bits. When the first immediate portion is stored in the first instruction, no additional available spaces for storing the immediate value may be left within the first instruction.

A portion of the immediate value that is other than the first immediate portion may be the second immediate portion.

In operation S940, the data processing device 110 stores the first immediate portion in the first instruction and stores the second immediate portion in the second instruction.

When the first immediate portion is stored in the first instruction, the first immediate portion may be stored in the immediate value allocated space of the first instruction.

When the second immediate portion is stored in the second instruction, the second immediate portion may be stored in an immediate value allocated space of the second instruction.

Since operations S950 and S960 correspond to operations S720 and S730, respectively, detailed descriptions thereof will be omitted herein for the sake of brevity.

In operation S980, the data processing device 110 may store the immediate value in the immediate value allocated space of the first instruction. This is the case where a sufficient space is allocated in the first instruction to store the immediate value, and thus the data processing device 110 may not divide the immediate value into the first immediate portion and the second immediate portion.

In operation S970, the data processing device 110 performs an operation by using a value indicated by the second instruction and an immediate value.

The immediate value, being an operand, when the operation is performed in operation S960, may be an immediate value determined in operation S960 or the immediate value stored in the first instruction in operation S980.

The value indicated by the second instruction may be received from at least one of the catenator 620, the instruction decode unit 220, the immediate register files 240, the register file 230, the general register file, and the execution unit. For example, the value stored in a register corresponding to the address of the register file 230 stored in a predetermined field of the second instruction may be an operand for performing an operation.

Figure 10:
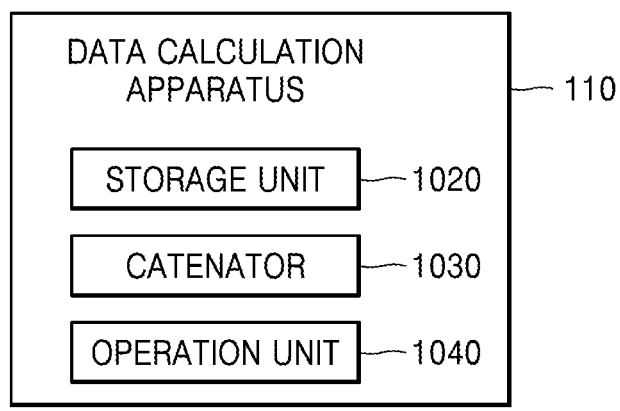
FIG. 10 is a block diagram of a structure of a data processing device according to some embodiments.

FIG. 10 is a block diagram of a structure of the data processing device 110.

Referring to FIG. 10, the data calculation apparatus 110 may include a storage unit 1020, a catenator 1030, and an operation unit 1040. Only components related with the present embodiment from among the components of the data processing device 110 are shown in FIG. 10. It will be understood by one of ordinary skill in the art related with the present embodiment that general-use components other than the components illustrated in FIG. 10 may be further included.

It will also be understood by one of ordinary skill in the art related with the present embodiment that the storage unit 1020, the catenator 1030, and the operation unit 1040 of FIG. 10 may be independent devices.

The storage unit 1020, the catenator 1030, and the operation unit 1040 of FIG. 10 may be a single processor or a plurality of processors. A processor may be implemented by an array of a plurality of logic gates, or by a combination of a general-use microprocessor and a memory in which a program executable by the general-use microprocessor is stored. It will also be understood by one of ordinary skill in the art to which this example pertains that the processor may be implemented by other types of hardware.

The data processing device 110 of FIG. 10 is an embodiment of a structure that concretely implements an operation of the data processing device 110.

The data processing device 110 may perform an operation by using a first instruction and the second instruction. The first instruction may include at least one of an MTII instruction, an MTI instruction, and an MFI instruction, and the second instruction may include at least one of an ADDI2 instruction and a MADI2 instruction. As described above, the types of the first instruction and the second instruction and the number of operands are not limited.

An immediate value, being an operand, may include a first immediate portion and a second immediate portion. The immediate value may be determined by catenating the first immediate portion and the second immediate portion.

The storage unit 1020 may determine an immediate value allocated space, which is a data storage space allocated within the first instruction to store the immediate value, and store the determined first and second immediate portions based on the determined immediate value allocated space. For example, the storage unit 1020 may store the determined first immediate portion such that a data storage space required to store the first immediate portion is equal to the immediate value allocated space.

An operation of determining the first immediate portion and the second immediate portion may be performed in a compiler stored in a storage medium. For example, a compiler stored in a storage medium may perform an operation of determining the first immediate portion and the second immediate portion. As another example, the compiler stored in a storage medium may include the storage unit 1020. In this case, the storage unit 1020 may perform the operation of determining the first immediate portion and the second immediate portion.

A detailed method of determining the first immediate portion and the second immediate portion has been described above with reference to FIG. 9.

The storage unit 1020 may determine the immediate value allocated space, which is the data storage space allocated within the first instruction to store the immediate value, and may determine the first immediate portion and the second immediate portion when a data storage space required to store the immediate value is larger than the determined immediate value allocated space. When the data storage space required to store the immediate value is smaller than the immediate value allocated space, the storage unit 1020 may not divide the immediate value into the first immediate portion and the second immediate portion.

The storage unit 1020 may determine the number of bits required to store the first immediate portion and the number of bits required to store the second immediate portion. A detailed method of the determination may be previously determined. For example, the number of bits required to store the first immediate portion may be equal to the number of bits allocated within the first instruction to store the immediate value. A detailed operating method related with the first immediate portion and the second immediate portion has been described above with reference to FIGS. 7-9.

The storage unit 1020 may store the first immediate portion included in the first instruction. The storage unit 1020 may be at least one of the register file 230, the general register file, the immediate register file 240, RAM, DRAM, cache memory, internal memory, and external memory. A processing speed when the storage unit 1020 is a register may be increased, and a detailed description thereof has been described above with reference to FIGS. 3A, 3B and 3C.

The catenator 1030 may determine the immediate value by catenating the second immediate portion included in the second instruction with the first immediate portion stored in the storage unit 1020. The catenator 1030 may include the catenator 620 of FIG. 6.

The operation unit 1040 may perform an operation by using a value stored in the second instruction and the immediate value determined in the catenator 1030. The operation unit 1040 may include the above-described execution unit 260.

The operation unit 1040 may perform an operation by using a value stored in a register corresponding to the address included in the second instruction and the immediate value determined in the catenator 1030.

The operation unit 1040 may perform an operation by using values stored in registers corresponding to a plurality of addresses included in the second instruction and the immediate value determined in the catenator 1030.

The operation unit 1040 may receive the value indicated by the second instruction from an immediate register and perform an operation by using the received value and the immediate value determined in the catenator 1030.

The value indicated by the second instruction may include an immediate value included in the second instruction.

The operation unit 1040 may perform all operations performable by the above-described execution unit 260.

Throughout the specification, when a portion "includes" or "has" an element, another element may be further included, rather than excluding the existence of the other element, unless otherwise described.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

As described above, to execute a data processing method and a data processing device according to each embodiment of the present invention, the above-described programs may include a code that is readable by a processor (CPU) of a computer and is written in a computer language, such as C, C++, JAVA, or a machine language.

The code may include a function Code related with, for example, a function that defines the above-described functions, and may also include an execution procedure-related control code necessary for a processor of a computer to execute the above-described functions according to a predetermined procedure.

The code may further include a memory reference-related code regarding a location (address) of internal or external memory of a computer from which additional information or media necessary for a processor of a computer to execute the above-described functions is to be referred to.

Further, when a processor of a computer needs to communicate with any other remote computer or server in order to execute the above functions, the code may further include communication-related information about how the processor of the computer may communicate with any other remote computer or server by using a communication module (e.g., a wired and/or wireless communication module) of the computer and/or about which information or media the processor of the computer should transmit/receive for communication.

In addition, functional programs for accomplishing the present invention and codes and code segments related to the functional programs can be easily construed or changed by programmers skilled in the art to which the present invention pertains, by taking into account a system environment of computers that execute programs using a computer-readable recording medium.

While the present invention has been particularly shown and described with reference to exemplary embodiments thereof, it will be understood by those of ordinary skill in the art that various changes in form and details may be made therein without departing from the spirit and scope of the invention as defined by the appended claims. It should be understood that the disclosed embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

The invention claimed is:

1. A data processing method comprising:
receiving, by a processor, a first instruction including a first immediate portion of a first operand of an operation and a first address;
storing, by the processor in a register memory, the first immediate portion at a memory location corresponding to the first address;
receiving, by the processor, a second instruction including a second immediate portion of the first operand, the first address, and a second address corresponding to a location of a second operand of the operation;
retrieving the second operand based on the second address included in the second instruction;
determining, by the processor, the first operand; and
performing, by the processor, the operation by using the determined first operand and the retrieved second operand,
wherein the determining of the first operand comprises:
retrieving the first immediate portion based on the first address included in the second instruction;
selecting a criterion from among a plurality of criteria to catenate the first immediate portion with the second immediate portion; and
catenating the first immediate portion with the second immediate portion according to the selected criterion from among the plurality of criteria,
wherein a first criterion among the plurality of criteria includes that the first immediate portion is upper bits of the first operand and the second immediate portion is lower bits of the first operand, and
wherein a second criterion is-among the plurality of criteria includes that the first immediate portion is lower bits of the first operand and the second immediate portion is upper bits of the first operand.

2. The data processing method of claim 1, wherein the register memory that stores the first immediate portion comprises an immediate register.

3. The data processing method of claim 1, wherein the performing of the operation comprises performing an operation by using values stored in registers of the register memory corresponding to a plurality of addresses included in the second instruction and the determined first operand.

4. The data processing method of claim 1, wherein the storing of the first immediate portion in the register memory comprises:
determining an immediate value allocated space, which is a data storage space allocated in the first instruction to store a corresponding immediate value; and
determining the first immediate portion and the second immediate portion, based on the determined immediate value allocated space.

5. The data processing method of claim 4, wherein the determining of the first immediate portion and the second immediate portion, based on the determined immediate value allocated space comprises determining the first immediate portion such that a data storage space required to store the first immediate portion is equal to the immediate value allocated space.

6. The data processing method of claim 1, wherein the storing of the first immediate portion in the register memory comprises:
determining an immediate value allocated space, which is a data storage space allocated in the first instruction to store a corresponding immediate value; and
determining the first immediate portion and the second immediate portion that constitute the first operand, when a data storage space required to store the first operand is larger than the immediate value allocated space.

7. The data processing method of claim 1, wherein the storing of the first immediate portion in the register memory comprises determining a number of bits required to store the first immediate portion and a number of bits required to store the second immediate portion.

8. A data processing device comprising:
a transceiver configured to:
receive a first instruction including a first immediate portion of a first operand of an operation and a first address, and
receive a second instruction including a second immediate portion of the first operand, the first address, and a second address corresponding to a location of a second operand of the operation;
a storage device configured to store the first immediate portion at a memory location corresponding to the first address;
a catenator configured to catenate the second immediate portion with the stored first immediate portion to determine the first operand; and
a processor configured to perform an operation by using the determined first operand and the second operand,
wherein, to perform the operation, the processor is configured to:
retrieve from the storage device the first immediate portion based on the first address of the second instruction,
retrieve the second operand based on the second address included in the second instruction,
selecting a criterion from among a plurality of criteria to catenate the first immediate portion with the second immediate portion, and
control the catenator to catenate the first immediate portion with the second immediate portion according to the selected criterion from among the plurality of criteria,
wherein a first criterion among the plurality of criteria includes that the first immediate portion is upper bits of the first operand and the second immediate portion is lower bits of the first operand, and
wherein a second criterion among the plurality of criteria includes that the first immediate portion is lower bits of the first operand and the second immediate portion is upper bits of the first operand.

9. The data processing device of claim 8, wherein the storage device comprises at least one of a register and an immediate register.

10. A non-transitory computer-readable recording medium having recorded thereon a computer program, which, when executed by a computer, performs the data processing method of claim 1.

11. The data processing method of claim 1,
wherein the first criterion among the plurality of criteria further includes a number of the upper bits of the first operand for the first immediate portion and a number of the lower bits of the first operand for the second immediate portion, and
wherein the second criterion among the plurality of criteria further includes a number of the upper bits of the first operand for the second immediate portion and a number of the lower bits of the first operand for the first immediate portion.

12. The data processing device of claim 8,
wherein the first criterion among the plurality of criteria further includes a number of the upper bits of the first operand for the first immediate portion and a number of the lower bits of the first operand for the second immediate portion, and
wherein the second criterion among the plurality of criteria further includes a number of the upper bits of the first operand for the second immediate portion and a number of the lower bits of the first operand for the first immediate portion.

* * * * *